US008837083B1

(12) United States Patent
Sasaki et al.

(10) Patent No.: US 8,837,083 B1
(45) Date of Patent: Sep. 16, 2014

(54) MAGNETIC HEAD FOR PERPENDICULAR MAGNETIC RECORDING INCLUDING A HEATER

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/974,732

(22) Filed: Aug. 23, 2013

(51) Int. Cl.
*G11B 5/127* (2006.01)

(52) U.S. Cl.
USPC .................................................... 360/125.03

(58) Field of Classification Search
USPC ........................................................ 360/111
See application file for complete search history.

(56) References Cited

U.S. PATENT DOCUMENTS

| 7,791,839 | B2 * | 9/2010 | Olson et al. ............... 360/125.31 |
| 8,385,019 | B1 * | 2/2013 | Sasaki et al. .............. 360/123.03 |
| 8,514,520 | B2 * | 8/2013 | Sasaki et al. ............... 360/125.3 |
| 8,542,456 | B2 * | 9/2013 | Yamane et al. .................. 360/59 |
| 8,634,162 | B2 * | 1/2014 | Bonhote et al. ........... 360/125.02 |
| 8,701,273 | B2 * | 4/2014 | Sasaki et al. ................ 29/603.13 |
| 2009/0251828 | A1 | 10/2009 | Schreck et al. |
| 2012/0218662 | A1 | 8/2012 | Sasaki et al. |

FOREIGN PATENT DOCUMENTS

JP      A-2008-77751      4/2008

OTHER PUBLICATIONS

U.S. Appl. No. 13/867,647, filed Apr. 22, 2013, in the name of Sasaki et al.

* cited by examiner

*Primary Examiner* — Mark Blouin
(74) *Attorney, Agent, or Firm* — Oliff PLC

(57) ABSTRACT

A magnetic head includes a main pole, a return path section, a heater for heating the main pole, and a metal portion. The metal portion is isolated from the return path section and disposed such that the heater is interposed between the main pole and the metal portion. The return path section has a contact surface in contact with the main pole. The metal portion is located farther from the medium facing surface than is the contact surface. The main pole and the metal portion define therebetween a receiving space for receiving at least part of the heater. The at least part of the heater is received in the receiving space.

8 Claims, 21 Drawing Sheets

MAGNETIC HEAD FOR PERPENDICULAR MAGNETIC RECORDING INCLUDING A HEATER

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a heater for allowing the end face of the main pole located in the medium facing surface to protrude.

2. Description of the Related Art

The recording systems of magnetic read/write apparatuses include a longitudinal magnetic recording system in which signals are magnetized in a direction along the plane of a recording medium (the longitudinal direction) and a perpendicular magnetic recording system in which signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is designed to slightly fly over the surface of a recording medium by means of an airflow that comes from the leading end into the space between the medium facing surface and the recording medium.

It is demanded of magnetic disk drives that the distance from the end face of the main pole located in the medium facing surface to the surface of the recording medium be reduced in order to provide higher recording densities while preventing the writing capability of the write head unit from being reduced with higher density recording. To meet this, there has been proposed a technology of heating the main pole with a heater to allow the end face of the main pole to protrude to thereby reduce the distance from the end face of the main pole to the surface of the recording medium, as disclosed in U.S. Patent Application Publication Nos. 2009/0251828 A1 and 2012/0218662 A1, for example. U.S. Patent Application Publication Nos. 2009/0251828 A1 and 2012/0218662 A1 each disclose a magnetic head with a heater provided within an insulating layer near the main pole.

JP 2008-77751A discloses a magnetic head including a heater and a thermal conductive layer disposed near the heater.

In a conventional magnetic head including a heater for heating the main pole, components of the write head unit other than the main pole are also heated by the heater. A typical component of the write head unit other than the main pole is a write shield disclosed in U.S. Patent Application Publication No. 2012/0218662 A1. The write shield has an end face located near the end face of the main pole in the medium facing surface.

For the conventional magnetic head including the heater, since the components of the write head unit other than the main pole are also heated by the heater as mentioned above, it is difficult to allow the end face of the main pole to greatly protrude relative to its neighboring surroundings located in the medium facing surface. The conventional magnetic head thus has a disadvantage that the distance from the end face of the main pole to the surface of the recording medium cannot be sufficiently reduced and therefore it is not possible to achieve sufficiently high recording density. Further, for the conventional magnetic head, the end face of the main pole does not always protrude by the greatest amount when compared with the other parts of the end face of the write head unit located in the medium facing surface. If any part of the end face of the write head unit other than the end face of the main pole protrudes by the greatest amount, it becomes difficult to recognize and control the distance from the end face of the main pole to the surface of the recording medium.

OBJECT AND SUMMARY OF THE INVENTION

It is an object of the present invention to provide a magnetic head for perpendicular magnetic recording that includes a heater for heating the main pole and is capable of increasing the amount of protrusion of the end face of the main pole while suppressing protrusion of portions located around the end face of the main pole in the medium facing surface.

A magnetic head for perpendicular magnetic recording of the present invention includes a medium facing surface facing a recording medium, a coil producing a magnetic field corresponding to data to be written on the recording medium, a main pole, a return path section formed of a magnetic material, a heater, and a metal portion formed of a metal material. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The return path section allows a portion of a magnetic flux that has been produced from the end face of the main pole and has magnetized a portion of the recording medium to flow back to the main pole. The heater is located away from the medium facing surface and heats the main pole. The metal portion is isolated from the return path section and disposed such that the heater is interposed between the main pole and the metal portion.

In the magnetic head of the present invention, the return path section has one or more contact surfaces in contact with the main pole. The one or more contact surfaces are located away from the medium facing surface. The metal portion is located farther from the medium facing surface than are the one or more contact surfaces. The main pole and the metal portion define therebetween a receiving space for receiving at least part of the heater. The at least part of the heater is received in the receiving space.

In the magnetic head of the present invention, the metal portion may be in contact with or isolated from the main pole.

The magnetic head of the present invention may further include a write shield formed of a magnetic material and having an end face located in the medium facing surface, and a gap part formed of a nonmagnetic material and provided between the main pole and the write shield. The write shield is magnetically connected to the return path section.

In the magnetic head of the present invention, the heater and the metal portion may be located on the front side or the rear side in the direction of travel of the recording medium relative to the main pole.

In the magnetic head of the present invention, the heater may include a first heater portion located on the front side in the direction of travel of the recording medium relative to the main pole, and a second heater portion located on the rear side in the direction of travel of the recording medium relative to the main pole. In such a case, the metal portion may include a first portion disposed such that the first heater portion is interposed between the main pole and the first portion, and a second portion disposed such that the second heater portion is interposed between the main pole and the second portion.

In the magnetic head of the present invention, the metal material used to form the metal portion may be a magnetic metal material. In such a case, the return path section may include a magnetic layer formed of the same magnetic metal material as that used for the metal portion.

In the magnetic head of the present invention, at least part of the heater is received in the receiving space defined between the main pole and the metal portion that is located farther from the medium facing surface than are the one or more contact surfaces and isolated from the return path section. This allows the main pole to be efficiently heated by the heater. Consequently, the present invention makes it possible to increase the amount of protrusion of the end face of the main pole while suppressing protrusion of portions located around the end face of the main pole in the medium facing surface.

Other and further objects, features and advantages of the present invention will appear more fully from the following description.

DETAILED DESCRIPTION OF THE PREFERRED EMBODIMENTS

First Embodiment

Figure 1:
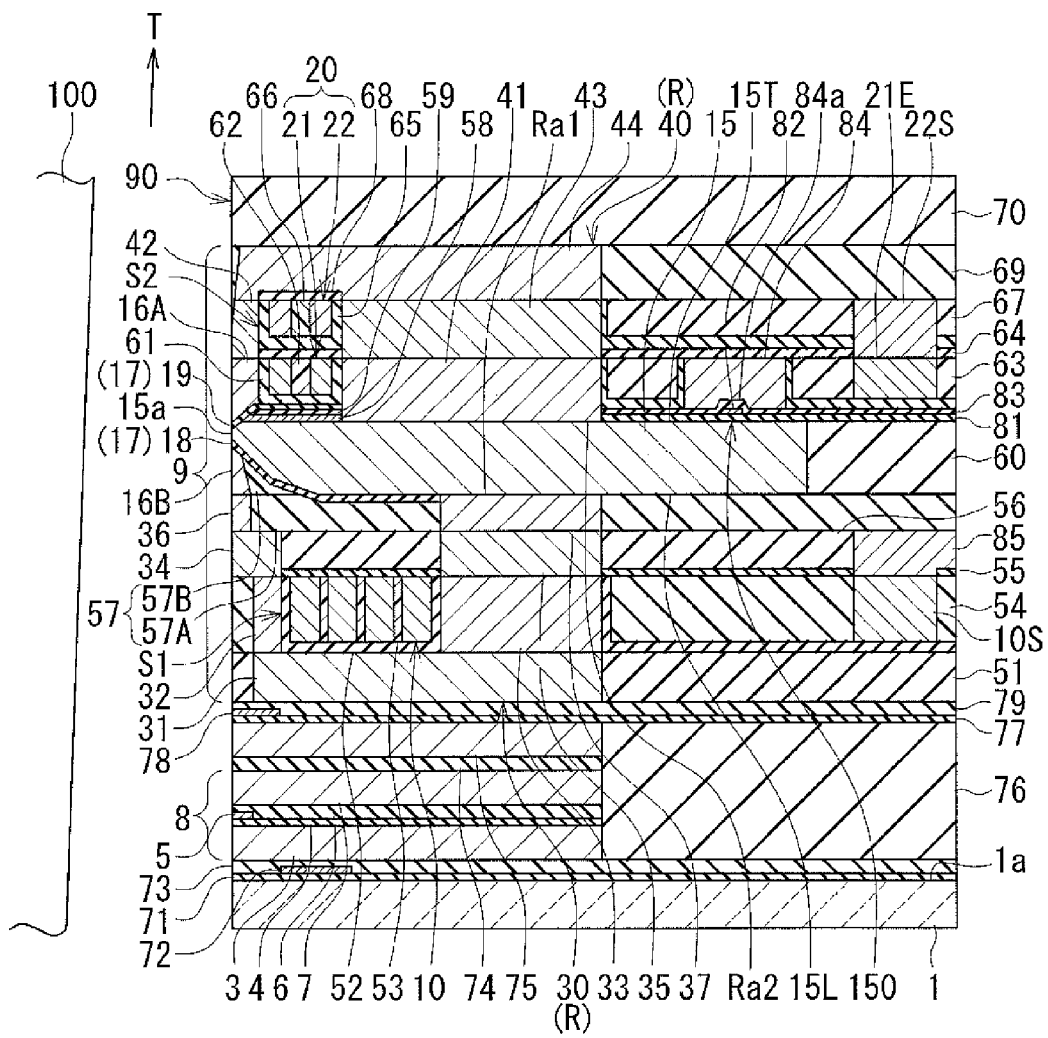
FIG. 1 is a cross-sectional view showing a magnetic head according to a first embodiment of the invention.
Figure 2:
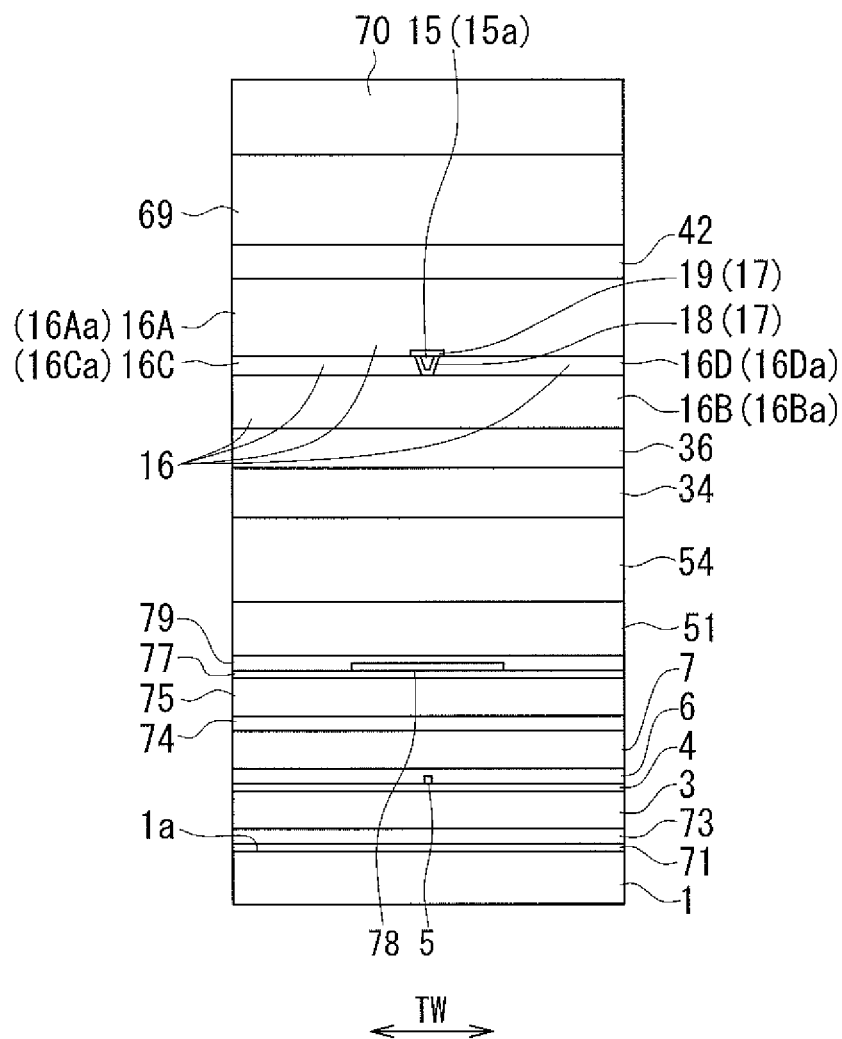
FIG. 2 is a front view showing the medium facing surface of the magnetic head according to the first embodiment of the invention.
Figure 3:
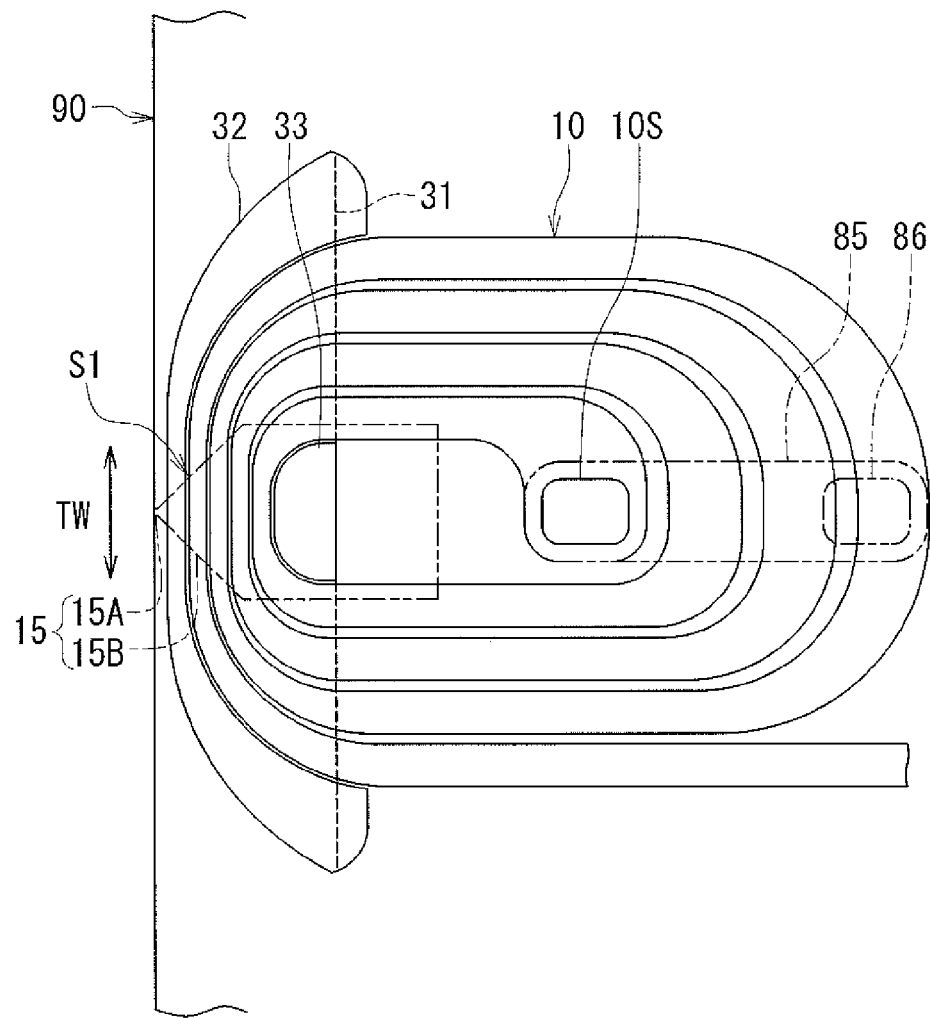
FIG. 3 is a plan view showing a first portion of a coil of the magnetic head according to the first embodiment of the invention.
Figure 4:
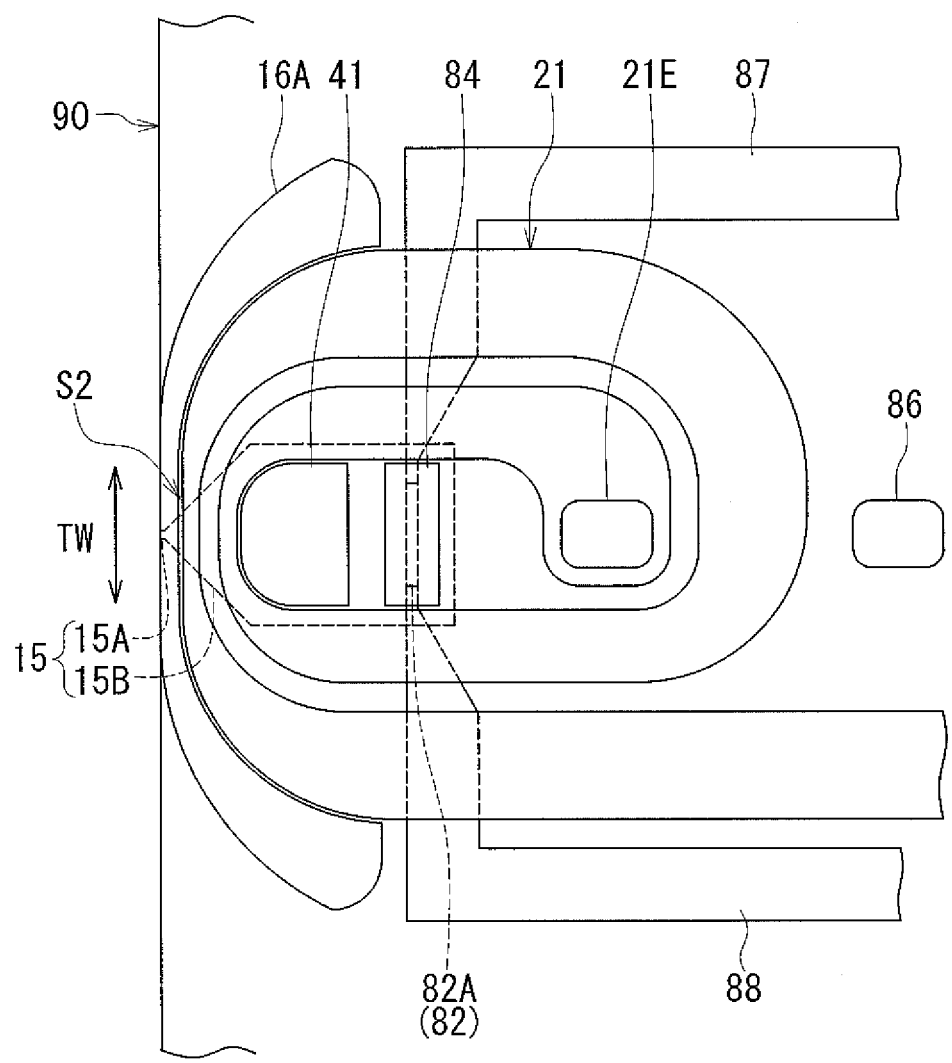
FIG. 4 is a plan view showing a first layer of a second portion of the coil and a heater of the magnetic head according to the first embodiment of the invention.
Figure 5:
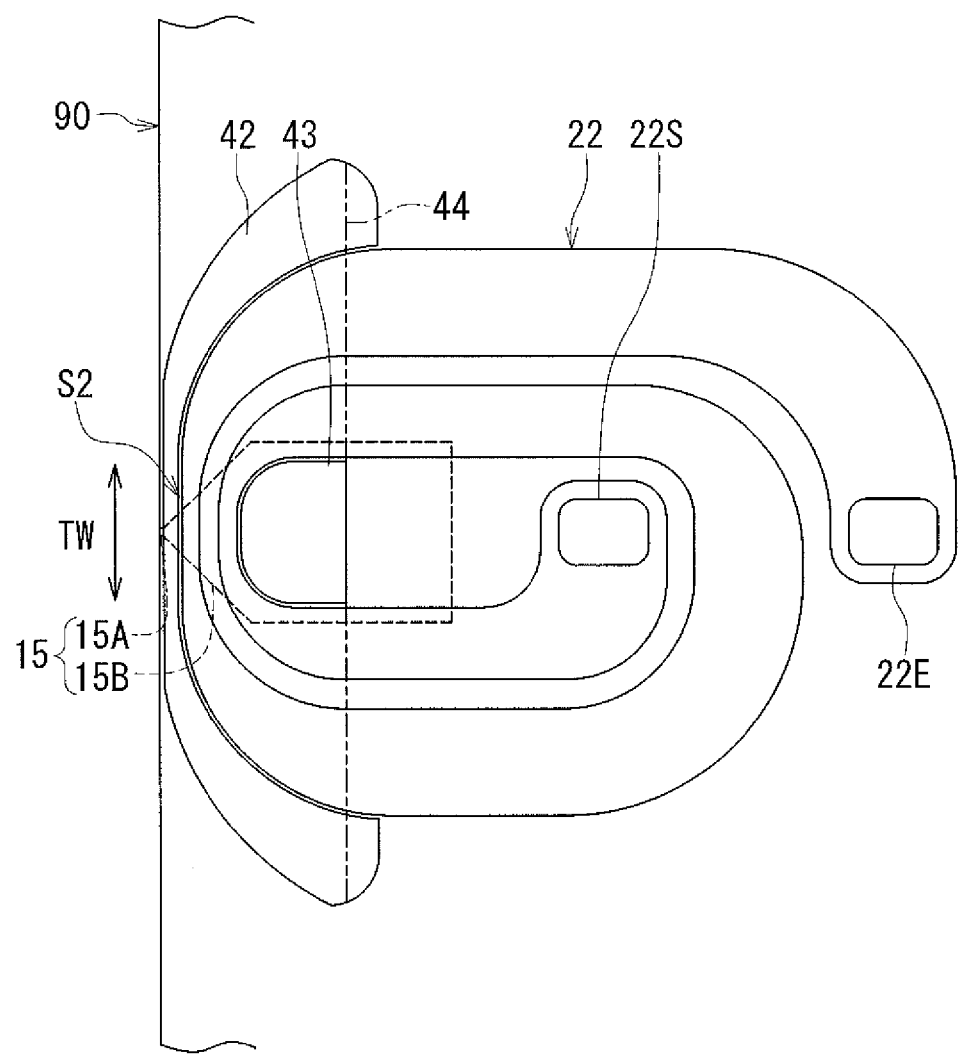
FIG. 5 is a plan view showing a second layer of the second portion of the coil of the magnetic head according to the first embodiment of the invention.

Preferred embodiments of the present invention will now be described in detail with reference to the drawings. First, reference is made to FIG. 1 to FIG. 5 to describe the configuration of a magnetic head according to a first embodiment of the invention. FIG. 1 is a cross-sectional view showing the magnetic head according to the present embodiment. The arrow with the symbol T in FIG. 1 indicates the direction of travel of a recording medium. FIG. 2 is a front view showing the medium facing surface of the magnetic head according to the present embodiment. FIG. 3 is a plan view showing a first portion of a coil of the magnetic head according to the present embodiment. FIG. 4 is a plan view showing a first layer of a second portion of the coil and a heater of the magnetic head according to the present embodiment. FIG. 5 is a plan view showing a second layer of the second portion of the coil of the magnetic head according to the present embodiment. The arrow with the symbol TW in each of FIG. 2 to FIG. 5 indicates the track width direction.

The magnetic head for perpendicular magnetic recording (hereinafter simply referred to as the magnetic head) according to the present embodiment is for use in, for example, a magnetic disk drive and is in the form of a slider to fly over the surface of a rotating recording medium 100. As shown in FIG. 1, the magnetic head (the slider) has a medium facing surface 90 facing the recording medium 100. The medium facing surface 90 has an air inflow end (a leading end) and an air outflow end (a trailing end). The slider is designed to slightly fly over the surface of the recording medium 100 by means of an airflow that comes from the leading end into the space between the medium facing surface 90 and the recording medium 100.

Here, the side of the positions closer to the leading end relative to a reference position will be defined as the leading side, and the side of the positions closer to the trailing end relative to the reference position will be defined as the trailing side. The leading side is the rear side in the direction T of travel of the recording medium 100 relative to the slider. The trailing side is the front side in the direction T of travel of the recording medium 100 relative to the slider.

As shown in FIG. 1 and FIG. 2, the magnetic head includes a substrate 1 formed of a ceramic material such as aluminum oxide-titanium carbide ($Al_2O_3$—TiC) and having a top surface 1a, an insulating layer 71 formed of an insulating material and disposed on the top surface 1a of the substrate 1, a heater 72 disposed on the insulating layer 71, and an insulating layer 73 formed of an insulating material and disposed to cover the insulating layer 71 and the heater 72. The insulating layers 71 and 73 are formed of alumina ($Al_2O_3$), for example. The heater 72 will be described in detail later.

The magnetic head further includes a read head unit 8 located on the front side in the direction T of travel of the recording medium 100, i.e., on the trailing side, relative to the insulating layer 73. The read head unit 8 includes a first read shield layer 3 formed of a magnetic material and disposed on the insulating layer 73, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 90. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The magnetic head further includes a nonmagnetic layer 74 formed of a nonmagnetic material and disposed on the second read shield layer 7, a middle shield layer 75 formed of a magnetic material and disposed on the nonmagnetic layer 74, and a nonmagnetic layer 76 formed of a nonmagnetic material and disposed around the read head unit 8, the nonmagnetic layer 74 and the middle shield layer 75. The nonmagnetic layers 74 and 76 are formed of alumina, for example.

The magnetic head further includes a nonmagnetic layer 77 formed of a nonmagnetic material and disposed on the middle shield layer 75 and the nonmagnetic layer 76, a contact sensor 78 disposed on the nonmagnetic layer 77, and a nonmagnetic layer 79 formed of a nonmagnetic material and disposed to cover the nonmagnetic layer 77 and the contact sensor 78. The nonmagnetic layers 77 and 79 are formed of alumina, for example. The contact sensor 78 will be described in detail later.

The magnetic head further includes a write head unit 9 disposed on the nonmagnetic layer 79. The middle shield layer 75 has the function of shielding the MR element 5 from magnetic fields generated in the write head unit 9. The write head unit 9 includes a coil, a main pole 15, a write shield 16, a gap part 17, and a return path section R.

The coil produces a magnetic field corresponding to data to be written on the recording medium 100. The coil includes a first portion 10 and a second portion 20. The first portion 10 and the second portion 20 are both formed of a conductive material such as copper. The first portion 10 and the second portion 20 are connected in series or in parallel. The main pole 15 has an end face 15a located in the medium facing surface 90. The main pole 15 allows a magnetic flux corresponding to the magnetic field produced by the coil to pass, and produces a write magnetic field for writing data on the recording medium 100 by means of a perpendicular magnetic recording system. Consequently, a magnetic flux is produced from the end face 15a of the main pole 15 and magnetizes a portion of the recording medium 100. The return path section R allows a portion of the magnetic flux that has been produced from the end face 15a of the main pole 15 and has magnetized the portion of the recording medium 100 to flow back to the main pole 15. FIG. 1 and FIG. 2 each show a cross section that intersects the end face 15a of the main pole 15 located in the medium facing surface 90 and that is perpendicular to the medium facing surface 90 and to the top surface 1a of the substrate 1 (this cross section will hereinafter be referred to as the main cross section).

The write shield 16 has an end face located in the medium facing surface 90. The end face of the write shield 16 includes first to fourth end face portions 16Aa, 16Ba, 16Ca, and 16Da. The first end face portion 16Aa is located on the front side in the direction T of travel of the recording medium 100 relative to the end face 15a of the main pole 15. The second end face portion 16Ba is located on the rear side in the direction T of travel of the recording medium 100 relative to the end face 15a of the main pole 15. The third and fourth end face portions 16Ca and 16Da are located on opposite sides of the end face 15a of the main pole 15 in the track width direction TW. In the medium facing surface 90, the first to fourth end face portions 16Aa, 16Ba, 16Ca, and 16Da are arranged to wrap around the end face 15a of the main pole 15.

The write shield 16 is magnetically connected to the return path section R. The return path section R connects the write shield 16 and part of the main pole 15 located away from the medium facing surface 90 to each other, thereby magnetically coupling the write shield 16 and the main pole 15 to each other. Each of the write shield 16 and the return path section R is formed of a magnetic material. The material used for each of the write shield 16 and the return path section R may be CoFeN, CoNiFe, NiFe, or CoFe, for example.

The return path section R includes magnetic layers 31, 32, 33, 34, 35, 36, 37, 41, 42, 43 and 44. The magnetic layer 31 lies on the nonmagnetic layer 79. The magnetic layers 32 and 33 both lie on the magnetic layer 31. The magnetic layer 32 is located near the medium facing surface 90. The magnetic layer 33 is located farther from the medium facing surface 90 than is the magnetic layer 32. Each of the magnetic layers 31 and 32 has an end face that faces toward the medium facing surface 90 and that is located at a distance from the medium facing surface 90. As shown in FIG. 3, the first portion 10 of the coil is wound approximately four turns around the magnetic layer 33.

The magnetic head further includes: an insulating layer 51 formed of an insulating material, lying on the nonmagnetic layer 79 and surrounding the magnetic layer 31; an insulating film 52 formed of an insulating material and isolating the first portion 10 from the magnetic layers 31 to 33; an insulating layer 53 formed of an insulating material and disposed in the space between adjacent turns of the first portion 10; and an insulating layer 54 formed of an insulating material and disposed around the first portion 10 and the magnetic layers 32 and 33. The top surfaces of the first portion 10, the magnetic layers 32 and 33, the insulating film 52, and the insulating layers 53 and 54 are even with each other. The magnetic head further includes an insulating layer 55 formed of an insulating material and lying on the first portion 10, the insulating film 52 and the insulating layers 53 and 54. The insulating layers 51, 54 and 55 and the insulating film 52 are formed of alumina, for example. The insulating layer 53 is formed of a photoresist, for example.

The magnetic layer 34 lies on the magnetic layer 32 and the insulating layer 54. The magnetic layer 34 has an end face located in the medium facing surface 90. The magnetic layer 35 lies on the magnetic layer 33. The magnetic head further includes a lead layer 85 that is located farther from the medium facing surface 90 than is the magnetic layer 35 and lies on the insulating layer 55, and an insulating layer 56 lying on the insulating layer 55 and surrounding the magnetic layers 34 and 35 and the lead layer 85. The lead layer 85 penetrates the insulating layer 55 and is electrically connected to part of the first portion 10. The lead layer 85 is formed of a conductive material such as copper. The insulating layer 56 is formed of alumina, for example. The top surfaces of the magnetic layers 34 and 35, the lead layer 85 and the insulating layer 56 are even with each other.

The magnetic layer 36 lies on the magnetic layer 34. The magnetic layer 36 has an end face located in the medium facing surface 90. The magnetic layer 37 lies on the magnetic layer 35. The magnetic layer 37 is located away from the medium facing surface 90 and in contact with a portion of the main pole 15 located away from the medium facing surface 90. More specifically, the magnetic layer 37 is in contact with a portion of a bottom end of the main pole 15 located away from the medium facing surface 90, which will be described later.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium 100 relative to the main pole 15. The second shield 16B is located on the rear side in the direction T of travel of the recording medium 100 relative to the main pole 15. The side shields 16C and 16D magnetically couple the first shield 16A and the second shield 16B to each other.

As shown in FIG. 1 and FIG. 2, the first shield 16A has the first end face portion 16Aa, and also has a top surface and a bottom surface. The distance from the medium facing surface 90 to an arbitrary point on the bottom surface of the first shield 16A increases with increasing distance from the arbitrary point to the top surface 1a of the substrate 1. The second shield 16B has the second end face portion 16Ba, and also has a top surface and a bottom surface. The distance from the top surface 1a of the substrate 1 to an arbitrary point on the top surface of the second shield 16B decreases with increasing distance from the arbitrary point to the medium facing surface 90. As shown in FIG. 2, the side shield 16C has the third end face portion 16Ca. The side shield 16D has the fourth end face portion 16Da.

The second shield 16B lies on the magnetic layer 36. The magnetic head further includes a nonmagnetic layer 57 formed of a nonmagnetic material. The nonmagnetic layer 57 includes a first layer 57A and a second layer 57B. The first layer 57A lies on the top surface of the insulating layer 56 and a portion of the top surface of the magnetic layer 34, and surrounds the magnetic layers 36 and 37. The second layer 57B lies on the first layer 57A and surrounds the second shield 16B. The nonmagnetic layer 57 is formed of alumina, for example.

The main pole 15 has the end face 15a, a top surface 15T (see FIG. 1) lying at the front end in the direction T of travel of the recording medium 100, a bottom end 15L (see FIG. 1) opposite to the top surface 15T, and first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is provided between the main pole 15 and the write shield 16. The magnetic head further includes a first gap layer 19 formed of a nonmagnetic material and including a portion that constitutes a first portion of the gap part 17, and a second gap layer 18 formed of a nonmagnetic material and including a portion that constitutes a second portion of the gap part 17. The portion of the first gap layer 19 constituting the first portion of the gap part 17 is located between the main pole 15 and the first shield 16A. The portion of the second gap layer 18 constituting the second portion of the gap part 17 is located between the main pole 15 and each of the second shield 16B and the side shields 16C and 16D.

The side shields 16C and 16D are disposed on the second shield 16B. The second gap layer 18 is arranged to extend along the sidewalls of the side shields 16C and 16D, the top surface of the second shield 16B, the top surface of the second layer 57B and a portion of the top surface of the first layer 57A. The nonmagnetic material used to form the second gap layer 18 may be an insulating material or a nonmagnetic metal material. Alumina is an example of an insulating material that can be used to form the second gap layer 18. Ru is an example of a nonmagnetic metal material that can be used to form the second gap layer 18.

The main pole 15 lies on the second shield 16B, the first layer 57A and the second layer 57B such that the second gap layer 18 is interposed between the main pole 15 and each of the top surface of the second shield 16B, the top surface of the second layer 57B and the portion of the top surface of the first layer 57A. As shown in FIG. 2, the second gap layer 18 is interposed also between the main pole 15 and each of the side shields 16C and 16D.

A portion of the bottom end 15L of the main pole 15 located away from the medium facing surface 90 is in contact with the top surface of the magnetic layer 37. The main pole 15 is formed of a magnetic metal material. The material used for the main pole 15 may be one of NiFe, CoNiFe, and CoFe, for example. The shape of the main pole 15 will be described in detail later.

The magnetic head further includes a nonmagnetic layer 60 formed of a nonmagnetic material and disposed around the main pole 15 and the side shields 16C and 16D. The nonmagnetic layer 60 is formed of alumina, for example.

The magnetic head further includes a nonmagnetic metal layer 58 formed of a nonmagnetic metal material, located away from the medium facing surface 90 and lying on a portion of the top surface 15T of the main pole 15, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example.

The first gap layer 19 is disposed to cover the main pole 15, the nonmagnetic metal layer 58 and the insulating layer 59. The material used for the first gap layer 19 may be a nonmagnetic insulating material such as alumina or a nonmagnetic conductive material such as Ru, NiCu, Ta, W, NiB, or NiP.

The first shield 16A is disposed over the side shields 16C and 16D and the first gap layer 19. In the medium facing surface 90, part of the first end face portion 16Aa of the first shield 16A is spaced from the end face 15a of the main pole 15 by a predetermined distance created by the thickness of the first gap layer 19. The thickness of the first gap layer 19 preferably falls within the range of 5 to 60 nm, and may be 30 to 60 nm, for example. The end face 15a of the main pole 15 has a side adjacent to the first gap layer 19. This side of the end face 15a defines the track width.

The magnetic layer 41 is located away from the medium facing surface 90 and in contact with a portion of the main pole 15 located away from the medium facing surface 90. More specifically, the magnetic layer 41 is in contact with a portion of the top surface 15T of the main pole 15 located away from the medium facing surface 90.

The magnetic head further includes an insulating layer 81 formed of an insulating material. The insulating layer 81 lies on respective portions of the top surface 15T of the main pole 15 and the top surface of the nonmagnetic layer 60 on which none of the first gap layer 19, the magnetic layer 41 and the nonmagnetic metal layer 58 are present. The insulating layer 81 is formed of alumina, for example.

The magnetic head further includes a heater 82 disposed on the insulating layer 81, an insulating layer 83 formed of an insulating material and covering the insulating layer 81 and the heater 82, and a metal portion 84 formed of a metal material and disposed on the insulating layer 83. The insulating layer 83 is formed of alumina, for example.

The heater 82 is provided for heating the main pole 15. The heater 82 is located away from the medium facing surface 90. The metal portion 84 is isolated from the return path section R and disposed such that the heater 82 is interposed between the main pole 15 and the metal portion 84. The insulating layers 81 and 83 are interposed between the main pole 15 and the metal portion 84. The insulating layer 81 is interposed between the heater 82 and the main pole 15. The insulating layer 83 is interposed between the heater 82 and the metal portion 84. The heater 82 will be described in more detail later.

The metal material used to form the metal portion 84 may be a magnetic metal material. For example, CoFeN, CoNiFe, NiFe or CoFe may be the magnetic metal material used to form the metal portion 84. Where the metal material used to form the metal portion 84 is a magnetic metal material, the magnetic layer 41 may be formed of the same magnetic metal material as that used for the metal portion 84. The magnetic layer 41 and the metal portion 84 are disposed such that an imaginary plane passing through the magnetic layer 41 and the metal portion 84 can lie parallel to the top surface 1a of the substrate 1.

The second portion 20 of the coil includes a first layer 21 and a second layer 22. As shown in FIG. 4, the first layer 21 is wound approximately two turns around the magnetic layer 41 and the metal portion 84. The magnetic head further includes: an insulating film 61 formed of an insulating material and isolating the first layer 21 from the first shield 16A, the first gap layer 19, the magnetic layer 41 and the metal portion 84; an insulating layer 62 formed of an insulating material and disposed in the space between adjacent turns of the first layer 21; and a nonmagnetic layer 63 formed of a nonmagnetic material and disposed around the first layer 21, the first shield 16A and the metal portion 84. The first layer 21 is adjacent to the magnetic layer 41 and the metal portion 84 with the insulating film 61 interposed therebetween when seen at positions on opposite sides in the track width direction TW relative to the main cross section. The position of a portion of the inner wall of the innermost turn of the first layer 21 is determined by the positions of two end faces of the magnetic layer 41 that are opposite to each other in the track width direction TW and the positions of two end faces of the metal portion 84 that are opposite to each other in the track width direction TW. The insulating film 61 and the nonmagnetic layer 63 are formed of alumina, for example. The insulating layer 62 is formed of a photoresist, for example. The top surfaces of the first shield 16A, the first layer 21, the magnetic layer 41, the metal portion 84, the insulating film 61 and the nonmagnetic layer 63 are even with each other.

The magnetic head further includes an insulating layer 64 formed of an insulating material and disposed over the top surfaces of the first layer 21, the metal portion 84, the insulating film 61, the insulating layer 62 and the nonmagnetic layer 63. The insulating layer 64 is formed of alumina, for example.

The magnetic layer 42 lies on the first shield 16A. The magnetic layer 42 has an end face located in the medium facing surface 90, a top surface, a bottom surface, and a connecting surface connecting the end face and the top surface to each other. The distance from the medium facing surface 90 to an arbitrary point on the connecting surface of the magnetic layer 42 increases with increasing distance from the arbitrary point to the top surface 1a of the substrate 1.

The magnetic layer 43 lies on the magnetic layer 41. As shown in FIG. 5, the second layer 22 is wound two turns around the magnetic layer 43. The magnetic head further includes: an insulating film 65 formed of an insulating material and isolating the second layer 22 from the magnetic layers 42 and 43 and the insulating layer 64; an insulating layer 66 formed of an insulating material and disposed in the space between adjacent turns of the second layer 22; and a nonmagnetic layer 67 formed of a nonmagnetic material and disposed around the second layer 22 and the magnetic layers 42 and 43. The insulating film 65 and the nonmagnetic layer 67 are formed of alumina, for example. The insulating layer 66 is formed of a photoresist, for example. The top surfaces of the second layer 22, the magnetic layers 42 and 43, the insulating film 65, the insulating layer 66 and the nonmagnetic layer 67 are even with each other. The magnetic head further includes an insulating layer 68 formed of an insulating material and disposed over the top surfaces of the second layer 22, the insulating film 65 and the insulating layer 66. The insulating layer 68 is formed of alumina, for example.

The magnetic layer 44 is disposed over the magnetic layers 42 and 43 and the insulating layer 68, and connects the magnetic layer 42 and the magnetic layer 43 to each other. The magnetic layer 44 has an end face that faces toward the medium facing surface 90 and that is located at a distance from the medium facing surface 90. The distance from the medium facing surface 90 to an arbitrary point on the end face of the magnetic layer 44 increases with increasing distance from the arbitrary point to the top surface 1a of the substrate 1.

The magnetic head further includes a nonmagnetic layer 69 formed of a nonmagnetic material and disposed around the magnetic layer 44, and a protective layer 70 formed of a nonmagnetic material and disposed to cover the write head unit 9. A portion of the nonmagnetic layer 69 is interposed between the medium facing surface 90 and each of the connecting surface of the magnetic layer 42 and the end face of the magnetic layer 44 that faces toward the medium facing surface 90. The nonmagnetic layer 69 and the protective layer 70 are formed of alumina, for example.

As has been described, the magnetic head according to the present embodiment includes the medium facing surface 90, the read head unit 8, the write head unit 9, the heater 72, and the contact sensor 78. The read head unit 8 is located on the rear side in the direction T of travel of the recording medium 100, i.e., the leading side, relative to the write head unit 9.

The heater 72 is located on the rear side in the direction T of travel of the recording medium 100, i.e., the leading side, relative to the read head unit 8. The heater 72 is provided for allowing part of the medium facing surface 90, mainly the end face of the read head unit 8 located in the medium facing surface 90, to protrude toward the recording medium 100.

The heater 72 includes a line-shaped conductor that generates heat when energized. The line-shaped conductor may be meandering in shape. The magnetic head according to the present embodiment includes a pair of leads (not illustrated) that are connected to opposite ends of the line-shaped conductor. The line-shaped conductor is configured to be energized through the pair of leads to thereby generate heat. For example, the line-shaped conductor is formed of a film of NiCr or a layered film consisting of Ta, NiCu, and Ta films.

The heat generated by the line-shaped conductor is transferred to a plurality of components of the magnetic head located near the heater 72, such as the read shield layers 3 and 7 and the middle shield layer 75. The plurality of components of the magnetic head located near the heater 72 are thus heated by the heater 72. These components expand by being heated. As a result, part of the medium facing surface 90, mainly the end face of the read head unit 8, protrudes toward the recording medium 100.

The contact sensor 78 is disposed between the read head unit 8 and the write head unit 9. The contact sensor 78 is provided for detecting contact of part of the medium facing surface 90 with the recording medium 100. The contact sensor 78 is a resistor that varies in resistance with a change in its own temperature upon contact of part of the medium facing surface 90 with the recording medium 100. The resistor extends in the track width direction TW. The magnetic head according to the present embodiment includes a pair of leads (not illustrated) that are connected to opposite ends of the resistor. The resistor is formed of a metal material or a semiconductor material that varies in resistance at a relatively high rate with respect to a change in temperature, i.e., that has a relatively high temperature coefficient of resistance. Specifically, the material for the resistor may be NiFe, W, Cu, Ni, or Pt, for example.

Upon contact of part of the medium facing surface 90 with the recording medium 100, the frictional heat resulting from the contact raises the temperature of the medium facing surface 90 at and in the vicinity of the part in contact with the recording medium 100. Such a rise in temperature also raises the temperature of the contact sensor 78 (the resistor) itself. As a result, the contact sensor 78 varies in resistance. It is thus possible to detect contact of part of the medium facing surface 90 with the recording medium 100 by measuring the resistance of the contact sensor 78 through the pair of leads.

The write head unit 9 includes the coil including the first and second portions 10 and 20, the main pole 15, the write shield 16, the gap part 17, the return path section R, the heater 82, and the metal portion 84. The write shield 16 includes the first shield 16A, the second shield 16B, and the two side shields 16C and 16D. The return path section R includes the magnetic layers 31 to 37 and 41 to 44.

The magnetic layers 31 to 37 constitute a first magnetic path 30 that is located on the rear side in the direction T of travel of the recording medium 100 relative to the main pole 15 and connects the write shield 16 and part of the main pole 15 located away from the medium facing surface 90 to each other. As shown in FIG. 1, the first magnetic path 30 connects the write shield 16 and the part of the main pole 15 located away from the medium facing surface 90 to each other so that a first space S1 is defined by the main pole 15, the gap part 17 (the gap layer 18), the write shield 16 and the first magnetic path 30 (the magnetic layers 31 to 37). The first portion 10 of the coil passes through the first space S1.

The magnetic layers 41 to 44 constitute a second magnetic path 40 that is located on the front side in the direction T of travel of the recording medium 100 relative to the main pole 15 and connects the write shield 16 and part of the main pole 15 located away from the medium facing surface 90 to each other. The second magnetic path 40 connects the write shield 16 and the part of the main pole 15 located away from the medium facing surface 90 to each other so that a second space S2 is defined by the main pole 15, the gap part 17 (the gap layer 19), the write shield 16 and the second magnetic path 40 (the magnetic layers 41 to 44). The second portion 20 of the coil passes through the second space S2.

The return path section R has one or more contact surfaces in contact with the main pole 15. More specifically, as shown in FIG. 1, the return path section R has a contact surface Ra1 in contact with the bottom end 15L of the main pole 15 and a contact surface Ra2 in contact with the top surface 15T of the main pole 15. The contact surface Ra1 is formed by the top surface of the magnetic layer 37. The contact surface Ra2 is formed by the bottom surface of the magnetic layer 41. The contact surfaces Ra1 and Ra2 are located away from the medium facing surface 90.

The heater 82 and the metal portion 84 are located on the front side in the direction T of travel of the recording medium 100 relative to the main pole 15. The metal portion 84 is located farther from the medium facing surface 90 than are the contact surfaces Ra1 and Ra2. The main pole 15 and the metal portion 84 define therebetween a receiving space 150 for receiving at least part of the heater 82. In the present embodiment, the metal portion 84 has a recess 84a that opens in the bottom surface of the metal portion 84. The recess 84a extends in the track width direction TW. The receiving space 150 is a space located between the recess 84a and the top surface 15T of the main pole 15.

At least part of the heater 82 is received in the receiving space 150. The heater 82 includes a line-shaped conductor 82A that generates heat when energized. The line-shaped conductor 82A is located in the receiving space 150. As shown in FIG. 4, the line-shaped conductor 82A extends linearly in the track width direction TW. The magnetic head according to the present embodiment includes a pair of leads 87 and 88 that are connected to opposite ends of the line-shaped conductor 82A. The line-shaped conductor 82A is configured to be energized through the pair of leads 87 and 88 to thereby generate heat. For example, the line-shaped conductor 82A is formed of a film of NiCr or a layered film consisting of Ta, NiCu, and Ta films. The function of the heater 82 will be described in detail later.

The magnetic head further includes an insulating portion formed of an insulating material and insulating the line-shaped conductor 82A from the main pole 15 and the metal portion 84. The insulating portion is constituted of a portion of the insulating layer 81 that is located between the line-shaped conductor 82A and the main pole 15 and a portion of the insulating layer 83 that is located between the line-shaped conductor 82A and the metal portion 84.

The first and second portions 10 and 20 of the coil will now be described in detail with reference to FIG. 1 and FIG. 3 to FIG. 5. FIG. 3 is a plan view showing the first portion 10. The first portion 10 is wound approximately four turns around the magnetic layer 33 which constitutes part of the first magnetic path 30. The first portion 10 includes a portion that extends to pass between the magnetic layer 32 and the magnetic layer 33, in particular, within the first space S1. The first portion 10 has a coil connection 10S electrically connected to the lead layer 85.

FIG. 4 is a plan view showing the first layer 21 of the second portion 20. The first layer 21 is wound approximately two turns around the metal portion 84 and around the magnetic layer 41 which constitutes part of the second magnetic path 40. The first layer 21 includes a portion that extends to pass between the first shield 16A and the magnetic layer 41, in particular, within the second space S2. The first layer 21 has a coil connection 21E electrically connected to the second layer 22.

FIG. 5 is a plan view showing the second layer 22 of the second portion 20. The second layer 22 is wound two turns around the magnetic layer 43 which constitutes part of the second magnetic path 40. The second layer 22 includes a portion that extends to pass between the magnetic layer 42 and the magnetic layer 43, in particular, within the second space S2. The second layer 22 has a coil connection 22S penetrating the insulating layer 64 and the insulating film 65 and electrically connected to the coil connection 21E of the first layer 21, and a coil connection 22E electrically connected to the lead layer 85.

The coil connection 22E is electrically connected to the lead layer 85 via a connection layer 86 of columnar shape that penetrates a plurality of layers interposed between the second layer 22 and the lead layer 85. The connection layer 86 is formed of a conductive material such as copper. In the example shown in FIG. 3 to FIG. 5, the first portion 10 and the second portion 20 are connected in series via the lead layer 85 and the connection layer 86.

The shapes of the first shield 16A, the second shield 16B and the magnetic layers 31 to 37 and 41 to 44 will now be described in detail with reference to FIG. 3 to FIG. 5. The first shield 16A has a central portion, and two side portions located on opposite sides of the central portion in the track width direction TW. The central portion includes the first end face portion 16Aa of the first shield 16A, and is disposed to intersect the main cross section. The two side portions are greater than the central portion in maximum length in the direction perpendicular to the medium facing surface 90. Like the first shield 16A, the magnetic layer 42 has a central portion intersecting the main cross section, and two side portions.

Although not illustrated, the second shield 16B has a central portion, and two side portions located on opposite sides of the central portion in the track width direction TW. The central portion includes the second end face portion 16Ba of the second shield 16B, and is disposed to intersect the main cross section. The two side portions are greater than the central portion in maximum length in the direction perpendicular to the medium facing surface 90. Like the second shield 16B, each of the magnetic layers 32, 34 and 36 has a central portion intersecting the main cross section, and two side portions.

The second shield 16B and the magnetic layers 31, 32, 34 and 36 constitute a first coil surrounding portion shaped to surround a part of the first portion 10. The first coil surrounding portion has a first end face constituted of the second end face portion 16Ba of the second shield 16 and the respective end faces of the magnetic layers 34 and 36. The first coil surrounding portion defines a space (hereinafter referred to as the first coil receiving space) whose width in the track width direction TW increases with increasing distance from the medium facing surface 90. Although not illustrated, the width of the first end face in the track width direction TW is smaller than the maximum width of the first coil receiving space in the track width direction TW.

Likewise, the first shield 16A and the magnetic layers 42 and 44 constitute a second coil surrounding portion shaped to surround a part of the second portion 20. The second coil surrounding portion has a second end face constituted of the first end face portion 16Aa of the first shield 16A and the end face of the magnetic layer 42. The second coil surrounding portion defines a space (hereinafter referred to as the second coil receiving space) whose width in the track width direction TW increases with increasing distance from the medium facing surface 90. As shown in FIG. 4 and FIG. 5, the width of the second end face in the track width direction TW is smaller than the maximum width of the second coil receiving space in the track width direction TW.

The shape of the main pole 15 will now be described in detail with reference to FIG. 1 to FIG. 5. As shown in FIG. 3 to FIG. 5, the main pole 15 includes a track width defining portion 15A and a wide portion 15B. The track width defining portion 15A has an end face located in the medium facing surface 90, and an end opposite to the end face. The wide portion 15B is connected to the end of the track width defining portion 15A. As shown in FIG. 1 and FIG. 2, the main pole 15 has the top surface 15T lying at the front end in the direction T of travel of the recording medium 100, the bottom end 15L opposite to the top surface 15T, the first side part, and the second side part. The top surface 15T of the main pole 15 includes the top surface of the track width defining portion 15A and the top surface of the wide portion 15B. The top surface of the wide portion 15B is greater than the top surface of the track width defining portion 15A in width in the track width direction TW.

The width of the top surface of the track width defining portion 15A in the track width direction TW is generally constant regardless of the distance from the medium facing surface 90. The width of the top surface of the wide portion 15B in the track width direction TW is, for example, equal to that of the top surface of the track width defining portion 15A at the boundary between the track width defining portion 15A and the wide portion 15B, and gradually increases with increasing distance from the medium facing surface 90, then becoming constant. Here, the length of the track width defining portion 15A in the direction perpendicular to the medium facing surface 90 will be referred to as the neck height. The neck height falls within the range of 0 to 0.3 µm, for example. A zero neck height means that the track width defining portion 15A is not present and thus an end face of the wide portion 15B is located in the medium facing surface 90.

The top surface 15T includes a first inclined portion and a first flat portion, the first inclined portion being closer to the medium facing surface 90. The first inclined portion has a first end located in the medium facing surface 90 and a second end opposite to the first end. The first flat portion is connected to the second end of the first inclined portion. The first inclined portion is inclined such that its second end is located on the front side in the direction T of travel of the recording medium 100 relative to its first end. The first flat portion extends in a direction substantially perpendicular to the medium facing surface 90.

The bottom end 15L includes a second inclined portion and a second flat portion, the second inclined portion being closer to the medium facing surface 90. The second inclined portion has a first end located in the medium facing surface 90 and a second end opposite to the first end. The second inclined portion may be an edge formed by two intersecting planes, or may be a plane connecting two planes to each other. The second flat portion is a plane connected to the second end of the second inclined portion. The second inclined portion is inclined such that its second end is located on the rear side in the direction T of travel of the recording medium 100 relative to its first end. The second flat portion extends in a direction substantially perpendicular to the medium facing surface 90.

The end face 15a of the main pole 15 located in the medium facing surface 90 has a first side adjacent to the first gap layer 19, a second side connected to one end of the first side, and a third side connected to the other end of the first side. The first side defines the track width. The position of an end of a record bit to be recorded on the recording medium 100 depends on the position of the first side. The end face 15a of the main pole 15 located in the medium facing surface 90 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to a direction perpendicular to the top surface 1a of the substrate 1. The first side has a length in the range of 0.05 to 0.20 µm, for example.

The function and effects of the magnetic head according to the present embodiment will now be described. The magnetic head writes data on the recording medium 100 by using the write head unit 9 and reads data stored on the recording medium 100 by using the read head unit 8. In the write head unit 9, the coil including the first and second portions 10 and 20 produces magnetic fields corresponding to data to be written on the recording medium 100. A magnetic flux corresponding to the magnetic field produced by the first portion 10 passes through the first magnetic path 30 of the return path section R and the main pole 15. A magnetic flux corresponding to the magnetic field produced by the second portion 20 passes through the second magnetic path 40 of the return path section R and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on the recording medium 100 by means of the perpendicular magnetic recording system.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 100. The write shield 16 also has the function of capturing a magnetic flux produced from the end face 15a of the main pole 15 and spreading in directions other than the direction perpendicular to the plane of the recording medium 100, so as to prevent the magnetic flux from reaching the recording medium 100.

Furthermore, the write shield 16 and the return path section R have the function of allowing a magnetic flux that has been produced from the end face 15a of the main pole 15 and has magnetized a portion of the recording medium 100 to flow back. More specifically, a portion of the magnetic flux that has been produced from the end face 15a of the main pole 15 and has magnetized the portion of the recording medium 100 flows back to the main pole 15 through the write shield 16 and the first magnetic path 30 of the return path section R. Another portion of the magnetic flux that has been produced from the end face 15a of the main pole 15 and has magnetized the portion of the recording medium 100 flows back to the main pole 15 through the write shield 16 and the second magnetic path 40 of the return path section R.

The write shield 16 includes the first shield 16A, the second shield 16B, and the two side shields 16C and 16D. The present embodiment thus makes it possible that, in regions on both the front side and the rear side in the direction T of travel of the recording medium 100 relative to the end face 15a of the main pole 15 and regions on opposite sides of the end face 15a of the main pole 15 in the track width direction TW, a magnetic flux that is produced from the end face 15a of the main pole 15 and spreads in directions other than the direction perpendicular to the plane of the recording medium 100 can be captured and thereby prevented from reaching the recording medium 100. Consequently, the present embodiment makes it possible to prevent the occurrence of a phenomenon that signals already written on one or more tracks in the neighborhood of a track targeted for writing are erased or attenuated during writing of a signal on the track targeted for writing (such a phenomenon will hereinafter be referred to as unwanted erasure).

Figure 6:
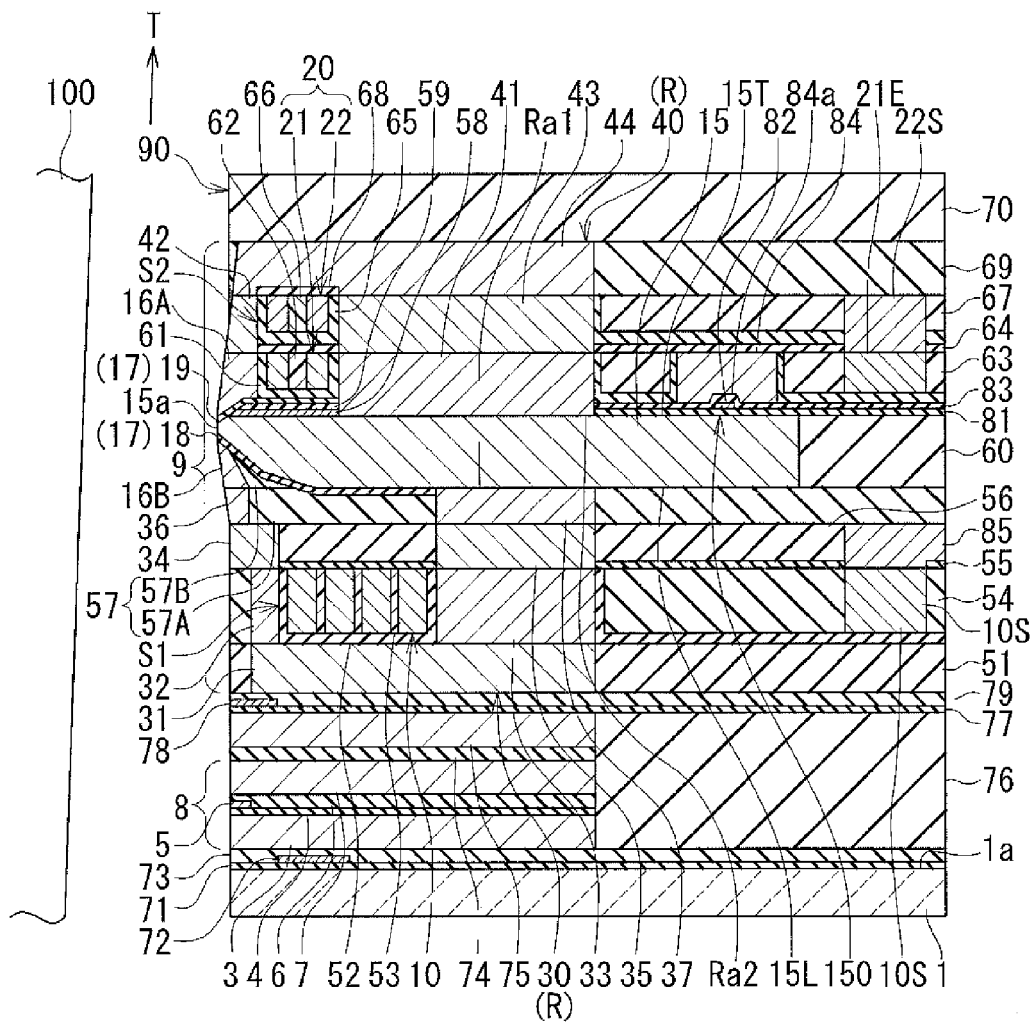
FIG. 6 is an explanatory diagram showing a protruded state of the end face of the main pole of the magnetic head according to the first embodiment of the invention.

The function of the heater 82 will now be described in detail. The line-shaped conductor 82A of the heater 82 generates heat when energized. The heat generated by the line-shaped conductor 82A is transferred to the main pole 15. The main pole 15 is thus heated by the heater 82. The main pole 15 expands by being heated, and as a result, the end face 15a of the main pole 15 located in the medium facing surface 90 protrudes toward the recording medium 100. FIG. 6 shows the state in which the end face 15a of the main pole 15 protrudes in this way. This reduces the distance from the end face 15a of the main pole 15 to the surface of the recording medium 100, thereby allowing for the enhancement of recording density.

Now, consider a magnetic head of a comparative example provided with, in place of the heater 82, a heater that lies in the vicinity of the main pole 15 and is closer to the medium facing surface 90 than is the contact surface Ra1 or Ra2. In the magnetic head of the comparative example, the heater heats not only the main pole 15 but also other components of the magnetic head, such as the return path section R and the write shield 16. It is thus difficult for the magnetic head of the comparative example to allow the end face 15a of the main pole 15 to greatly protrude relative to its neighboring surroundings located in the medium facing surface 90. The magnetic head of the comparative example thus has a disadvantage that the distance from the end face 15a of the main pole 15 to the surface of the recording medium 100 cannot be sufficiently reduced and therefore it is not possible to achieve sufficiently high recording density. Further, for the magnetic head of the comparative example, the end face 15a of the main pole 15 does not always protrude by the greatest amount when compared with the other parts of the end face of the write head unit 9 located in the medium facing surface 90. If any part of the end face of the write head unit 9 other than the end face 15a of the main pole 15 protrudes by the greatest amount, there arises a problem that it is difficult to recognize and control the distance from the end face 15a of the main pole 15 to the surface of the recording medium 100. For the magnetic head having the write shield 16, in particular, the end face of the write shield 16 surrounding the end face 15a of the main pole 15 protrudes when the return path section R and the write shield 16 are heated. This makes the aforementioned problem more noticeable.

In contrast, in the present embodiment, at least part of the heater 82 is received in the receiving space 150 defined between the main pole 15 and the metal portion 84. The metal portion 84 is located farther from the medium facing surface 90 than are the contact surfaces Ra1 and Ra2 and isolated from the return path section R. The heat generated by the heater 82 is transferred to the main pole 15 and the metal portion 84. The heat transferred from the heater 82 to the metal portion 84 is further transferred to the main pole 15. The main pole 15 is heated in this way. As mentioned above, the metal portion 84 is located farther from the medium facing surface 90 than are the contact surfaces Ra1 and Ra2 and isolated from the return path section R. Thus, the heat generated by the heater 82 is less likely to be transferred to components of the magnetic head other than the main pole 15 and the metal portion 84, such as the return path section R, in particular.

Consequently, the present embodiment allows the main pole 15 to be efficiently heated by the heater 82 while allowing components of the magnetic head other than the main pole 15 and the metal portion 84 to be prevented from being heated by the heater 82. The present embodiment thus makes it possible to increase the amount of protrusion of the end face 15a of the main pole 15 while suppressing protrusion of part of the medium facing surface 90 other than the end face 15a of the main pole 15.

Further, as shown in FIG. 6, the present embodiment allows the end face 15a of the main pole 15 to protrude by the greatest amount when compared with the other parts of the end face of the write head unit 9 located in the medium facing surface 90. The present embodiment thus makes it possible to recognize and control the distance from the end face 15a of the main pole 15 to the surface of the recording medium 100.

Now, a description will be given of an example of how to recognize and control the distance from the end face 15a of the main pole 15 to the surface of the recording medium 100. The amount of protrusion of the end face 15a of the main pole 15 has a correlation with the magnitude of supply power to the heater 82. Before shipment of a magnetic disk drive as a final product, the following test is performed. In the test, with the slider floated above the surface of a rotating recording medium 100, the magnitude of the power being supplied to the heater 82 is gradually increased to gradually increase the amount of protrusion of the end face 15a of the main pole 15. Upon contact of the end face 15a of the main pole 15 with the surface of the recording medium 100, the contact is detected by the contact sensor 78. This test determines the magnitude of supply power to the heater 82 at which the end face 15a of the main pole 15 comes into contact with the surface of the recording medium 100. Such magnitude of supply power will be referred to as "power at contact". At the time of shipment of a magnetic disk drive as a final product, the magnitude of supply power to the heater 82 is set to a predetermined value smaller than the power at contact. In this case, the distance from the end face 15a of the main pole 15 to the surface of the recording medium 100 can be recognized and controlled by the magnitude of supply power to the heater 82.

If the amount of protrusion of any part of the end face of the write head unit 9 other than the end face 15a of the main pole 15 is the greatest unlike the present embodiment, in the aforementioned test the contact sensor 78 detects a contact of the part other than the end face 15a of the main pole 15 with the surface of the recording medium 100. At this time, the distance from the end face 15a of the main pole 15 to the surface of the recording medium 100 is unknown. Thus, in this case, it is not possible to recognize and control the distance from the end face 15a of the main pole 15 to the surface of the recording medium 100.

It should be noted that in the present embodiment, the heater 72 can heat a plurality of components of the magnetic head located near the heater 72, and can thereby allow the end face of the read head unit 8 to protrude toward the recording medium 100 so as to reduce the distance from the read head unit 8 to the surface of the recording medium 100. This makes it possible to provide an increased recording density while preventing the reading capability of the read head unit 8 from being reduced with higher density recording.

The other effects provided by the present embodiment will now be described. If the first end face of the first coil surrounding portion constituted of the second shield 16B and the magnetic layers 31, 32, 34 and 36 is exposed over a large area in the medium facing surface 90, a portion of the magnetic flux captured into the first coil surrounding portion through a portion of the first end face located near the end face of the main pole 15 may leak toward the recording medium 100 through another portion of the first end face. This may result in the occurrence of unwanted erasure. On the other hand, if the first coil surrounding portion is reduced in dimension in the track width direction TW, the first coil surrounding portion decreases in volume and thus becomes prone to flux saturation. This may result in leakage of magnetic flux from the first end face toward the recording medium 100, and may thereby induce unwanted erasure.

In the present embodiment, the first coil surrounding portion is shaped to form the first coil receiving space, that is, shaped to surround a part of the first portion 10. This allows the first coil surrounding portion to be large in volume. On the other hand, the width in the track width direction TW of the first end face constituted of the second end face portion 16Ba of the second shield 16B and the respective end faces of the magnetic layers 34 and 36 is smaller than the maximum width in the track width direction TW of the first coil receiving space. This allows the first end face to be small in area. The present embodiment thus makes it possible that the first coil surrounding portion is large in volume while the first end face is small in area.

Likewise, the second coil surrounding portion constituted of the first shield 16A and the magnetic layers 42 and 44 is shaped to form the second coil receiving space, that is, shaped to surround a part of the second portion 20. This allows the second coil surrounding portion to be large in volume. On the other hand, the width in the track width direction TW of the second end face of the second coil surrounding portion constituted of the first end face portion 16Aa of the first shield 16A and the end face of the magnetic layer 42 is smaller than the maximum width in the track width direction TW of the second coil receiving space. This allows the second end face to be small in area. The present embodiment thus makes it possible that the second coil surrounding portion is large in volume while the second end face is small in area.

As discussed above, the present embodiment allows the first and second coil surrounding portions to be large in volume while allowing the first and second end faces exposed in the medium facing surface 90 to be small in area. Consequently, the present embodiment makes it possible to prevent leakage of magnetic flux from the first and second end faces that may occur in the case where the first and second end faces are exposed over a large area in the medium facing surface 90 or where the first and second coil surrounding portions are small in volume. The present embodiment thus allows for preventing unwanted erasure from occurring due to leakage of magnetic flux toward the recording medium 100 from the first and second end faces exposed in the medium facing surface 90.

A method of manufacturing the magnetic head according to the present embodiment will now be described. As shown in FIG. 1 and FIG. 2, the method of manufacturing the magnetic head according to the present embodiment starts with forming the insulating layer 71, the heater 72, the insulating layer 73, the first read shield layer 3, and the first read shield gap film 4 in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 74, the middle shield layer 75, the nonmagnetic layer 76, the nonmagnetic layer 77, the contact sensor 78, and the nonmagnetic layer 79 are formed in this order on the second read shield gap film 6.

Next, the magnetic layer 31 is formed on the nonmagnetic layer 79. Then, the insulating layer 51 is formed over the entire top surface of the stack. The insulating layer 51 is then polished by, for example, chemical mechanical polishing (hereinafter referred to as CMP), until the magnetic layer 31 is exposed. Next, the magnetic layers 32 and 33 are formed on the magnetic layer 31. The insulating film 52 is then formed over the entire top surface of the stack. Next, the first portion 10 is formed by frame plating, for example. The insulating layer 53 is then formed in the space between adjacent turns of the first portion 10. Next, the insulating layer 54 is formed over the entire top surface of the stack. The insulating layer 54 is then polished by, for example, CMP, until the first portion 10, the magnetic layers 32 and 33 and the insulating layer 53 are exposed.

Next, the insulating layer 55 is formed over the entire top surface of the stack. The insulating layer 55 is then selectively etched to form therein two openings for exposing the top surfaces of the magnetic layers 32 and 33 and an opening for exposing the coil connection 10S. Then, the magnetic layer 34 is formed on the magnetic layer 32, and the magnetic layer 35 is formed on the magnetic layer 33. Further, the lead layer 85 is formed on the coil connection 10S and the insulating layer 55.

Next, the insulating layer 56 is formed over the entire top surface of the stack. The insulating layer 56 is then polished by, for example, CMP, until the magnetic layers 34 and 35 and the lead layer 85 are exposed. Then, the magnetic layer 36 is formed on the magnetic layer 34, and the magnetic layer 37 is formed on the magnetic layer 35. Further, a portion of the connection layer 86 is formed on the lead layer 85. This portion of the connection layer 86 will hereinafter be referred to as the first portion of the connection layer 86. The connection layer 86 includes the first portion, and a second, a third, and a fourth portion stacked in this order on the first portion.

Next, the first layer 57A of the nonmagnetic layer 57 is formed over the entire top surface of the stack. The first layer 57A is then polished by, for example, CMP, until the magnetic layers 36 and 37 and the first portion of the connection layer 86 are exposed. Next, the second shield 16B is formed on the magnetic layer 36. A portion of the second shield 16B is then taper-etched by reactive ion etching (hereinafter referred to as RIE), for example. Next, the second layer 57B of the nonmagnetic layer 57 is formed around the second shield 16B. Respective portions of the second shield 16B, the first layer 57A and the second layer 57B are then taper-etched by ion beam etching (hereinafter referred to as IBE), for example.

Next, the side shields 16C and 16D are formed on the second shield 16B. Thereafter, the second gap layer 18 is formed over the entire top surface of the stack. The second gap layer 18 is then selectively etched to form therein openings for exposing the magnetic layer 36 and the first portion of the connection layer 86. The main pole 15 is then formed. Further, the second portion of the connection layer 86 is formed on the first portion of the connection layer 86. The main pole 15 and the second portion of the connection layer 86 are formed such that the top surfaces thereof are located at a higher level than portions of the second gap layer 18 lying on the side shields 16C and 16D. Next, the nonmagnetic layer 60 is formed over the entire top surface of the stack. The main pole 15, the second portion of the connection layer 86 and the nonmagnetic layer 60 are then polished by, for example, CMP, until the portions of the second gap layer 18 lying on the side shields 16C and 16D are exposed.

Figure 7:
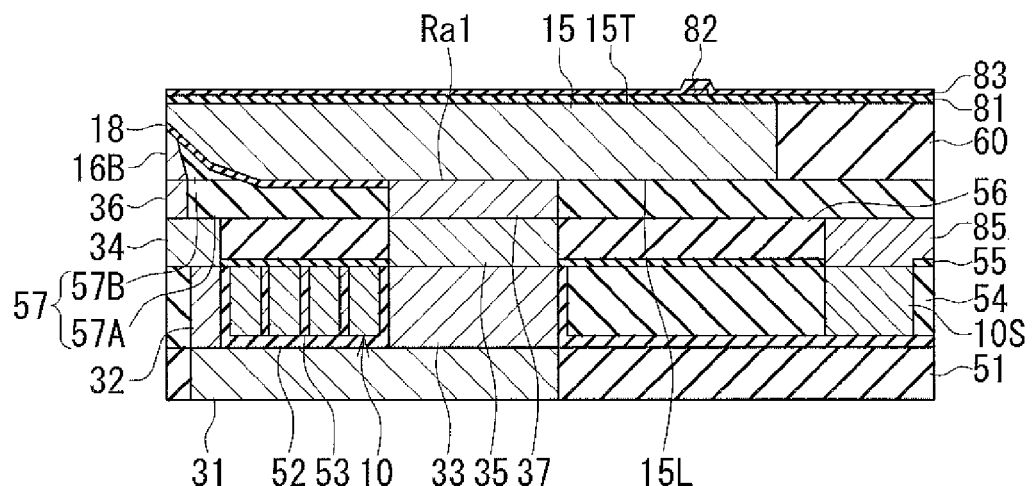
FIG. 7 is a cross-sectional view showing a step of a method of manufacturing the magnetic head according to the first embodiment of the invention.
Figure 8:
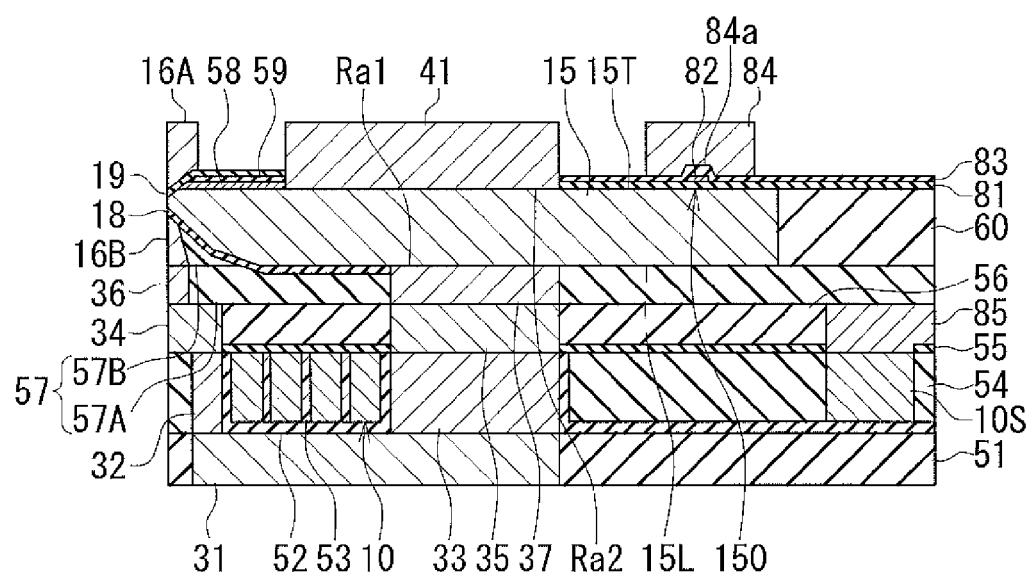
FIG. 8 is a cross-sectional view showing a step that follows the step shown in FIG. 7.

Reference is now made to FIG. 7 and FIG. 8 to describe a series of steps to be performed after the foregoing step up to the formation of the first shield 16A, the magnetic layer 41 and the metal portion 84. FIG. 7 and FIG. 8 each illustrate a stack of layers formed in the process of manufacturing the magnetic head. Each of FIG. 7 and FIG. 8 shows the main cross section. Portions that are closer to the substrate 1 relative to the magnetic layer 31 and the insulating layer 51 are omitted from FIG. 7 and FIG. 8.

FIG. 7 shows a step that follows the polishing of the second portion of the connection layer 86 and the nonmagnetic layer 60. In this step, first, the insulating layer 81 is formed over the entire top surface of the stack. Next, the heater 82 and the leads 87 and 88 (see FIG. 4) are formed on the insulating layer 81. The insulating layer 83 is then formed to cover the insulating layer 81, the heater 82 and the leads 87 and 88.

FIG. 8 shows the next step. In this step, first, the insulating layers 81 and 83 are selectively etched by, for example, IBE, so that a portion of the top surface 15T of the main pole 15, the top surfaces of the side shields 16C and 16D, and the top surface of the second portion of the connection layer 86 are exposed. Next, the nonmagnetic metal layer 58 and the insulating layer 59 are formed in this order on the main pole 15 and the side shields 16C and 16D. A photoresist mask (not illustrated) is then formed on the insulating layer 59. The photoresist mask is formed by patterning a photoresist layer. The photoresist mask does not cover a portion of the top surface of the stack that is located near the position at which the medium facing surface 90 is to be formed. Using the photoresist mask as an etching mask, respective portions of the main pole 15, the side shields 16C and 16D, the nonmagnetic metal layer 58, the insulating layer 59 and the nonmagnetic layer 60 are then etched by IBE, for example. The photoresist mask is then removed.

Next, the first gap layer 19 is formed to cover the main pole 15, the side shields 16C and 16D, the nonmagnetic metal layer 58 and the insulating layer 59. The first gap layer 19, the nonmagnetic metal layer 58 and the insulating layer 59 are then selectively etched by, for example, IBE, so that a portion of the top surface 15T of the main pole 15 and portions of the top surfaces of the side shields 16C and 16D are exposed. Next, the first shield 16A is formed on the side shields 16C and 16D and the first gap layer 19, the magnetic layer 41 is formed on the main pole 15, the metal portion 84 is formed on the insulating layer 83, and the third portion of the connection layer 86 is formed on the second portion of the connection layer 86. At this time, the first shield 16A, the magnetic layer 41 and the metal portion 84 may be formed of the same magnetic metal material.

Now, reference is made to FIG. 1 and FIG. 2 to describe steps to follow the formation of the first shield 16A, the magnetic layer 41 and the metal portion 84. First, the insulating film 61 is formed over the entire top surface of the stack. The insulating film 61 is then selectively etched to form therein an opening for exposing the top surface of the third portion of the connection layer 86. Next, the first layer 21 of the second portion 20 is formed by frame plating, for example. The outermost turn of the first layer 21 is formed such that a portion thereof rides on a first portion of the insulating film 61 that is located above the top surface of the first shield 16A. The innermost turn of the first layer 21 is formed such that portions thereof ride on a second portion of the insulating film 61 that is located above the top surfaces of the magnetic layer 41 and the metal portion 84. In the present embodiment, the portions of the innermost turn of the first layer 21 ride on two portions of the second portion of the insulating film 61 that are located on opposite sides in the track width direction TW relative to the main cross section, in particular. Further, the fourth portion of the connection layer 86 is formed on the third portion of the connection layer 86. The insulating layer 62 is then formed in the space between adjacent turns of the first layer 21. The fourth portion of the connection layer 86 and the insulating layer 62 are formed such that the top surfaces thereof are located at a higher level than the first and second portions of the insulating film 61. Next, the nonmagnetic layer 63 is formed over the entire top surface of the stack. The first layer 21, the fourth portion of the connection layer 86, the insulating layer 62 and the nonmagnetic layer 63 are then polished by, for example, CMP, until the first shield 16A, the magnetic layer 41 and the metal portion 84 are exposed.

Next, the insulating layer 64 is formed over the entire top surface of the stack. The insulating layer 64 is then selectively etched to form therein two openings for exposing the respective top surfaces of the first shield 16A and the magnetic layer 41. Then, the magnetic layer 42 is formed on the first shield 16A, and the magnetic layer 43 is formed on the magnetic layer 41. Next, the insulating film 65 is formed over the entire top surface of the stack. The insulating layer 64 and the insulating film 65 are then selectively etched to form therein openings for exposing the coil connection 21E of the first layer 21 and openings for exposing the top surface of the connection layer 86. The second layer 22 of the second portion 20, the insulating layer 66 and the nonmagnetic layer 67 are then formed. The second layer 22, the insulating layer 66 and the nonmagnetic layer 67 are formed by the same method as the method of forming the first layer 21, the insulating layer 62 and the nonmagnetic layer 63.

Next, the insulating layer 68 is formed over the second layer 22, the insulating film 65 and the insulating layer 66. The magnetic layer 44 is then formed over the magnetic layers 42 and 43 and the insulating layer 68. The magnetic layers 42 and 44 are then etched by, for example, RIE or IBE so as to provide the magnetic layer 42 with the aforementioned connecting surface and provide the magnetic layer 44 with the aforementioned end face. Next, the nonmagnetic layer 69 is formed over the entire top surface of the stack. The nonmagnetic layer 69 is then polished by, for example, CMP, until the magnetic layer 44 is exposed.

Next, the protective layer 70 is formed to cover the entire top surface of the stack. Wiring, terminals and other components are then formed on the protective layer 70, the substrate is cut for individual sliders, and processing including polishing of the medium facing surface 90 and fabrication of flying rails is performed to complete the magnetic head.

MODIFICATION EXAMPLE

Figure 9:
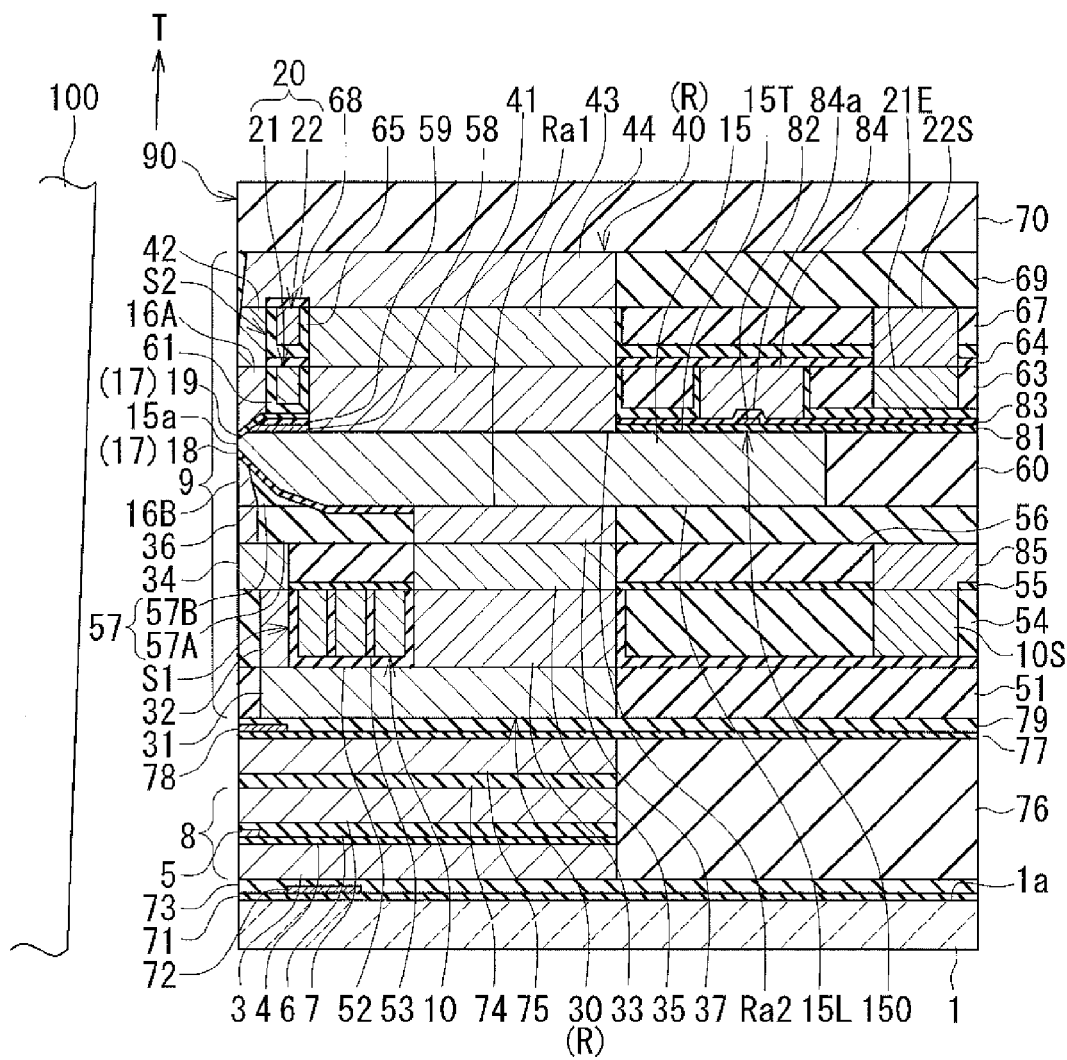
FIG. 9 is a cross-sectional view showing a modification example of the magnetic head according to the first embodiment of the invention.

A modification example of the magnetic head according to the present embodiment will now be described with reference to FIG. 9. FIG. 9 is a cross-sectional view showing the modification example of the magnetic head according to the present embodiment. In the modification example, the first portion 10 and the first and second layers 21 and 22 of the second portion 20 of the coil have their respective numbers of turns that are different from those of the example shown in FIG. 1 and FIG. 3 to FIG. 5. In the modification example, the first portion 10 is wound approximately three turns around the magnetic layer 33. The first layer 21 of the second portion 20 is wound approximately one turn around the magnetic layer 41 and the metal portion 84. The second layer 22 of the second portion 20 is wound one turn around the magnetic layer 43. Further, the modification example does not have the insulating layers 62 and 66.

With increases in frequency of write signals for higher recording densities, it is required of the magnetic head to provide an improved rate of change in the direction of the magnetic flux produced from the end face 15a of the main pole 15. Further, the position of an end of a record bit depends on the position of an end of the end face 15a of the main pole 15 located in the medium facing surface 90, the end being located on the front side in the direction T of travel of the recording medium 100. To achieve higher recording densities, it is thus required to improve not only the rate of change in the direction of the magnetic flux produced from the end face 15a of the main pole 15 but also the rate of change in the direction of the magnetic flux passing through the first shield 16A. To meet the requirement, it is effective to reduce the length of the second magnetic path 40 of the return path section R.

The modification example achieves a reduction in the length of the second magnetic path 40 by configuring the first and second layers 21 and 22 of the second portion 20 to be smaller in the number of turns when compared with the example shown in FIG. 1, FIG. 4 and FIG. 5. This makes it possible to improve both the rate of change in the direction of the magnetic flux produced from the end face 15a of the main pole 15 and the rate of change in the direction of the magnetic flux passing through the first shield 16A, thereby allowing for an increase in recording density.

The respective numbers of turns of the first portion 10 and the first and second layers 21 and 22 of the second portion 20 of the coil are not limited to the example shown in FIG. 1 and FIG. 3 to FIG. 5, or to the example shown in FIG. 9, and can be chosen as desired.

Second Embodiment

Figure 10:
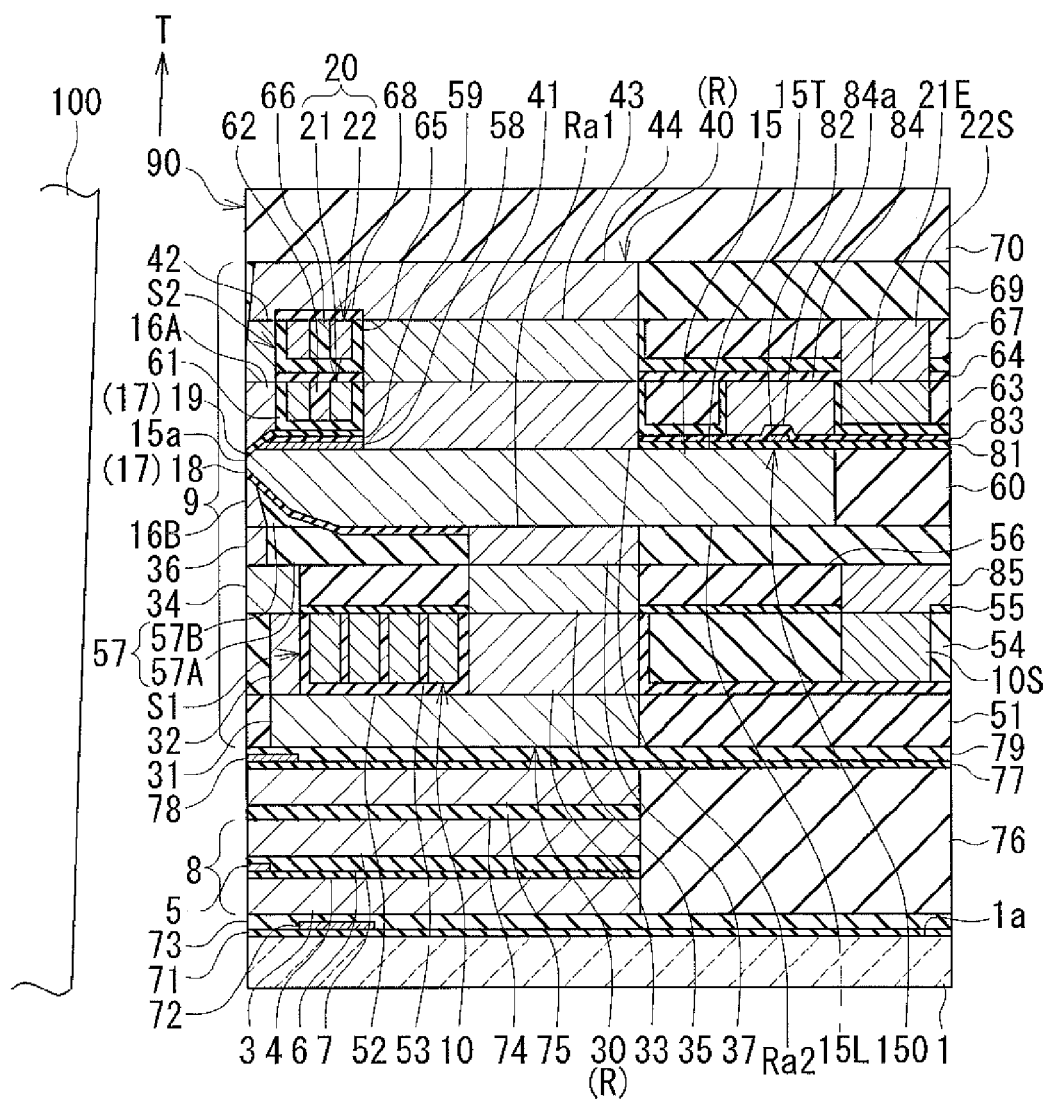
FIG. 10 is a cross-sectional view showing a magnetic head according to a second embodiment of the invention.
Figure 11:
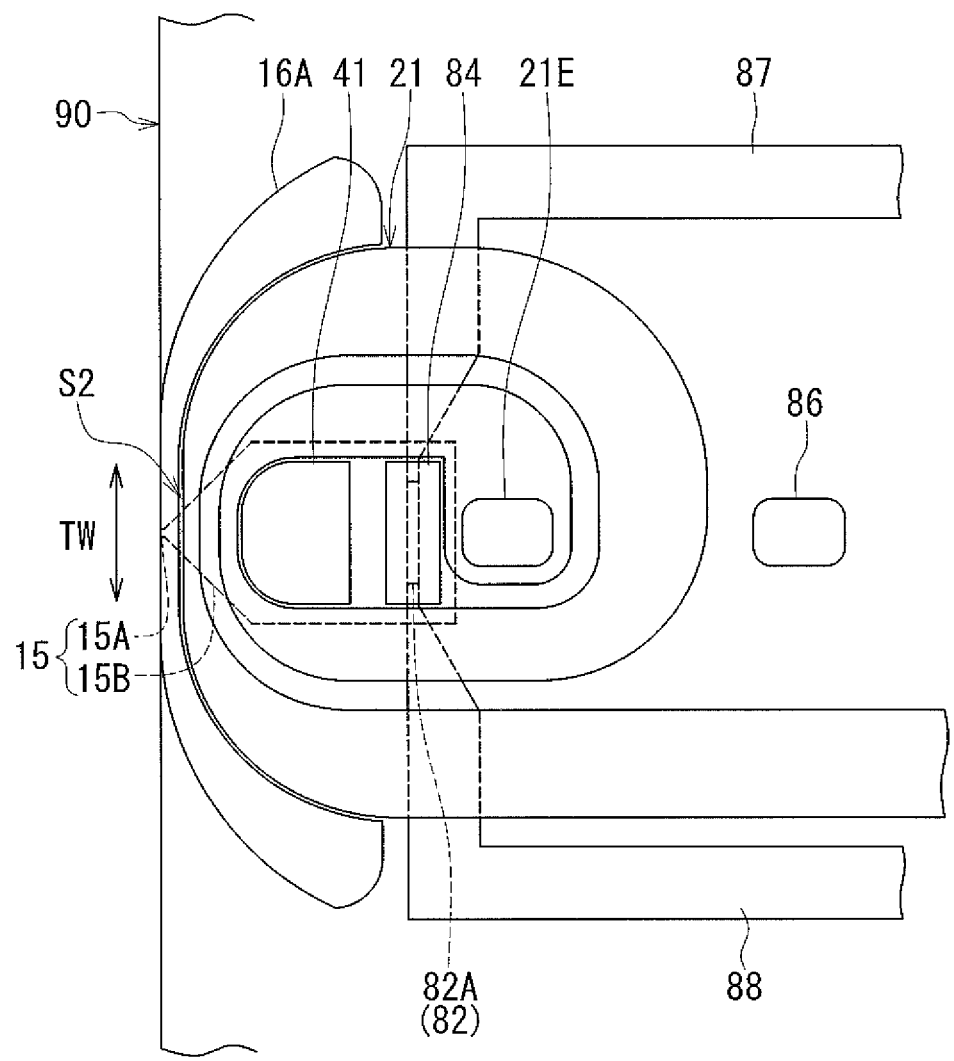
FIG. 11 is a plan view showing the first layer of the second portion of the coil and the heater of the magnetic head according to the second embodiment of the invention.

A magnetic head according to a second embodiment of the invention will now be described with reference to FIG. 10 and FIG. 11. FIG. 10 is a cross-sectional view showing the magnetic head according to the present embodiment. FIG. 11 is a plan view showing the first layer of the second portion of the coil and the heater of the present embodiment. In the present embodiment, the positioning of the first layer 21 of the second portion 20 of the coil and the metal portion 84 relative to each other is different from that in first embodiment. In the present embodiment, the first layer 21 is adjacent to the metal portion 84 with the insulating film 61 interposed therebetween when seen not only at the positions on opposite sides in the track width direction TW relative to the main cross section but also at a position on a side of the metal portion 84 opposite to the medium facing surface 90. In the present embodiment, the position of a portion of the inner wall of the innermost turn of the first layer 21 is determined by the positions of two end faces of the magnetic layer 41 that are opposite to each other in the track width direction TW and the positions of three end faces of the metal portion 84, of which two end faces are opposite to each other in the track width direction TW and the other one end face is opposite to the medium facing surface 90. The present embodiment allows the first layer 21 to be smaller in diameter than in the first embodiment.

The method of forming the first layer 21 in the present embodiment will now be described briefly. As described in the first embodiment section, the first layer 21 is formed by frame plating, for example. The outermost turn of the first layer 21 is formed such that a portion thereof rides on the first portion of the insulating film 61 located above the top surface of the first shield 16A. The innermost turn of the first layer 21 is formed such that portions thereof ride on the second portion of the insulating film 61 located above the top surfaces of the magnetic layer 41 and the metal portion 84. In the present embodiment, the portions of the innermost turn of the first layer 21 ride on two portions of the second portion of the insulating film 61 that are located on opposite sides in the track width direction TW relative to the main cross section, and on a portion of the second portion of the insulating film 61 that is located above the top surface of a portion of the metal portion 84 located farther from the medium facing surface 90, in particular. Next, as in the first embodiment, the fourth portion of the connection layer 86, the insulating layer 62 and the nonmagnetic layer 63 are formed and then the first layer 21, the fourth portion of the connection layer 86, the insulating layer 62 and the nonmagnetic layer 63 are polished by, for example, CMP, until the first shield 16A, the magnetic layer 41 and the metal portion 84 are exposed.

The remainder of configuration, function and effects of the present embodiment are similar to those of the first embodiment. In the present embodiment, the first portion 10 and the first and second layers 21 and 22 of the second portion 20 of the coil may have the respective numbers of turns that are the same as those in the modification example of the first embodiment.

Third Embodiment

Figure 12:
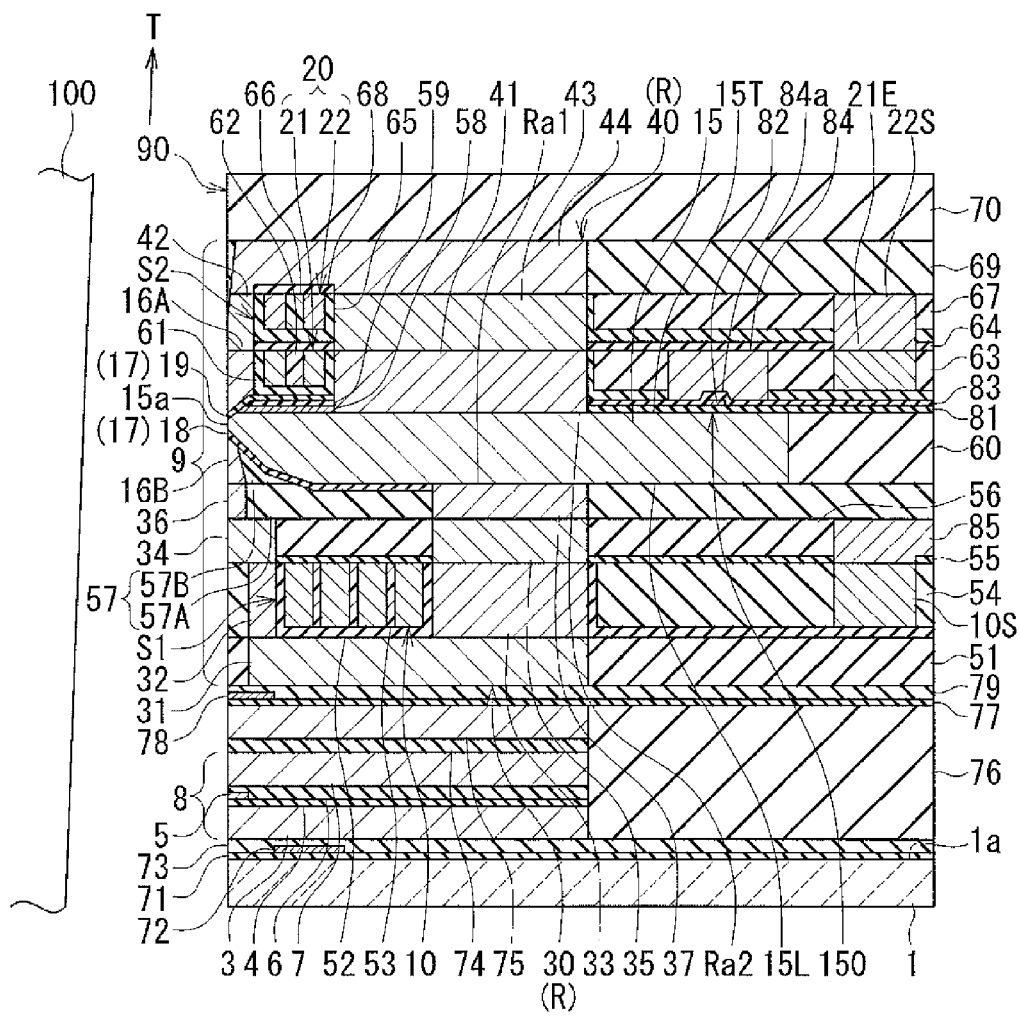
FIG. 12 is a cross-sectional view showing a magnetic head according to a third embodiment of the invention.
Figure 13:
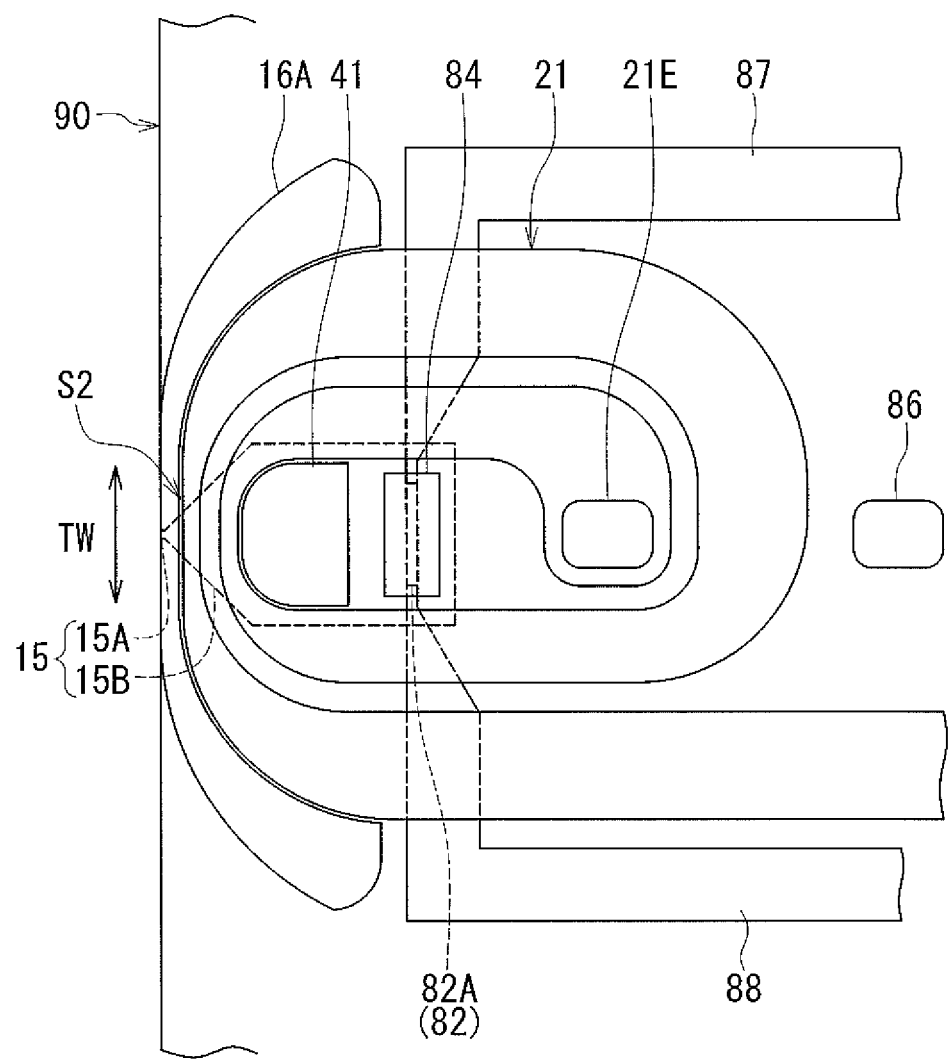
FIG. 13 is a plan view showing the first layer of the second portion of the coil and the heater of the magnetic head according to the third embodiment of the invention.

A magnetic head according to a third embodiment of the invention will now be described with reference to FIG. 12 and FIG. 13. FIG. 12 is a cross-sectional view showing the magnetic head according to the present embodiment. FIG. 13 is a plan view showing the first layer of the second portion of the coil and the heater of the present embodiment. In the present embodiment, the planar shape (the shape in a plan view) of the metal portion 84 is smaller in size when compared with the example of the first embodiment shown in FIG. 4. The nonmagnetic layer 63 is interposed between the first layer 21 and the metal portion 84.

The remainder of configuration, function and effects of the present embodiment are similar to those of the first embodiment. In the present embodiment, the first portion 10 and the first and second layers 21 and 22 of the second portion 20 of the coil may have the respective numbers of turns that are the same as those in the modification example of the first embodiment.

Fourth Embodiment

Figure 14:
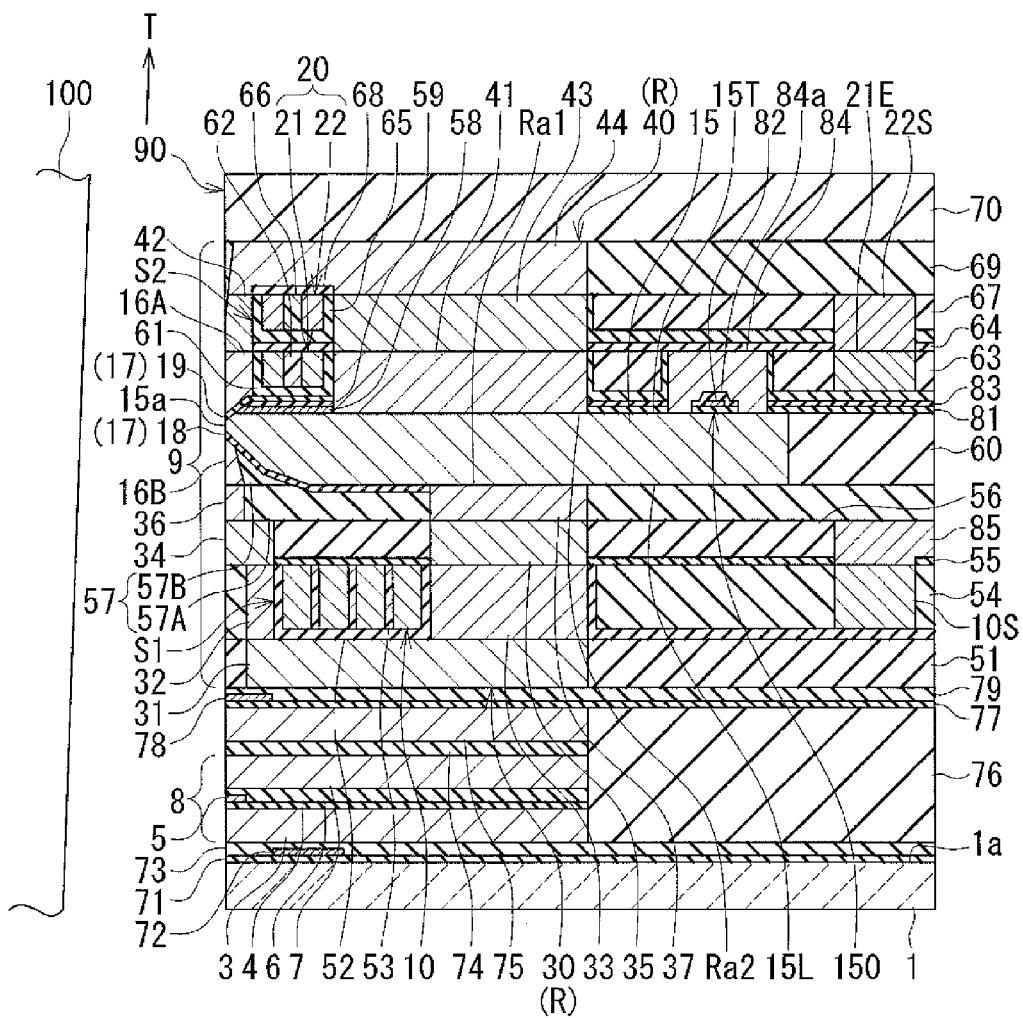
FIG. 14 is a cross-sectional view showing a magnetic head according to a fourth embodiment of the invention.

A magnetic head according to a fourth embodiment of the invention will now be described. First, reference is made to FIG. 14 to describe differences of the magnetic head according to the present embodiment from the magnetic head according to the first embodiment. FIG. 14 is a cross-sectional view showing the magnetic head according to the present embodiment. In the present embodiment, the metal portion 84 is in contact with the main pole 15. More specifically, portions of the insulating layers 81 and 83 of the first embodiment that are located between the main pole 15 and the metal portion 84 on the periphery of the heater 82 are eliminated in the present embodiment. The bottom surface of the metal portion 84 on the periphery of the heater 82 is thereby brought into contact with the top surface 15T of the main pole 15.

The present embodiment allows the main pole 15 to receive most of the heat generated by the heater 82 and transferred to the metal portion 84. The present embodiment thus allows the main pole 15 to be efficiently heated by the heater 82.

Figure 15:
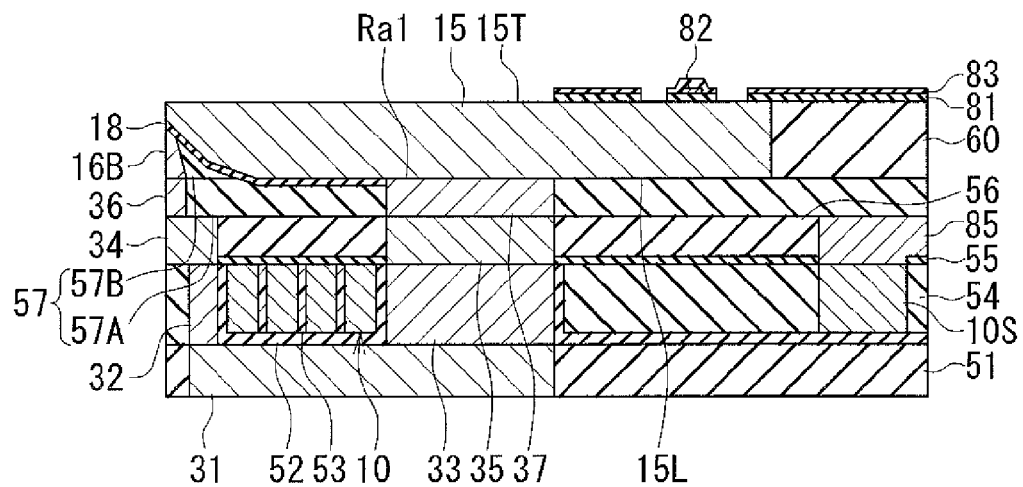
FIG. 15 is a cross-sectional view showing a step of a method of manufacturing the magnetic head according to the fourth embodiment of the invention.
Figure 16:
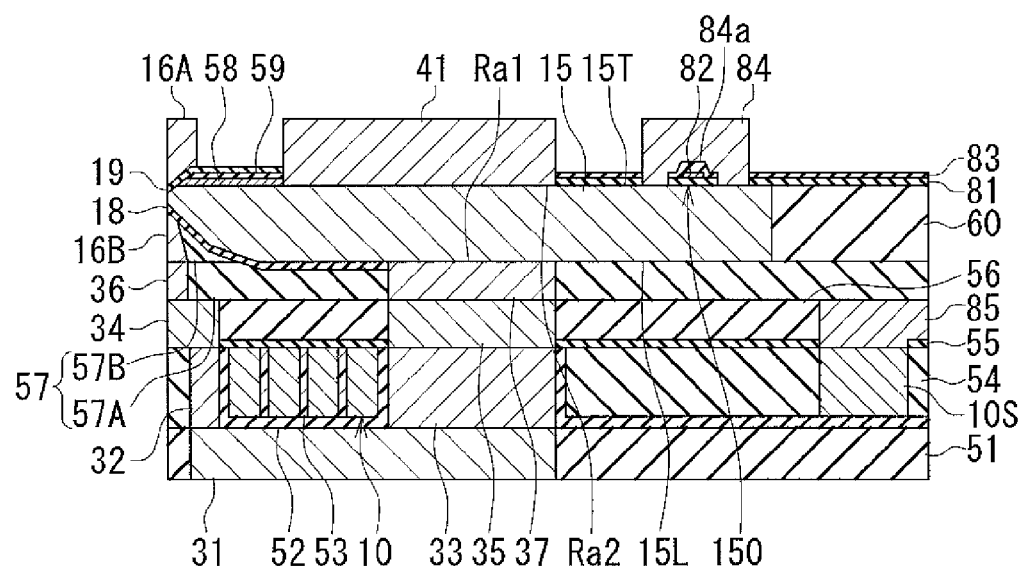
FIG. 16 is a cross-sectional view showing a step that follows the step shown in FIG. 15.

A method of manufacturing the magnetic head according to the present embodiment will now be described with reference to FIG. 15 and FIG. 16. FIG. 15 and FIG. 16 each illustrate a stack of layers formed in the process of manufacturing the magnetic head. Each of FIG. 15 and FIG. 16 shows the main cross section. Portions that are closer to the substrate 1 relative to the magnetic layer 31 and the insulating layer 51 are omitted from FIG. 15 and FIG. 16.

The method of manufacturing the magnetic head according to the present embodiment is the same as the method according to the first embodiment up to the step of forming the insulating layer 83. FIG. 15 shows the next step. In this step, the insulating layers 81 and 83 are selectively etched by, for example, IBE, so that a portion of the top surface 15T of the main pole 15, the top surfaces of the side shields 16C and 16D and the top surface of the second portion of the connection layer 86 are exposed. In the present embodiment, in particular, respective portions of the insulating layers 81 and 83 that are located in regions in which the main pole 15 and the metal portion 84 are in contact with each other are removed.

FIG. 16 shows the next step. In this step, the nonmagnetic metal layer 58, the insulating layer 59, the first gap layer 19, the first shield 16A, the magnetic layer 41, the metal portion 84, and the third portion of the connection layer 86 are formed in the same manner as the first embodiment. The subsequent steps are the same as those in the first embodiment.

The remainder of configuration, function and effects of the present embodiment are similar to those of the first embodiment. In the present embodiment, the first portion 10 and the first and second layers 21 and 22 of the second portion 20 of the coil may have the respective numbers of turns that are the same as those in the modification example of the first embodiment. Further, in the present embodiment, the positional relation between the first layer 21 and the metal portion 84 may be the same as that in the second embodiment. Further, the planar shape of the metal portion 84 in the present embodiment may be the same as that in the third embodiment.

Fifth Embodiment

Figure 17:
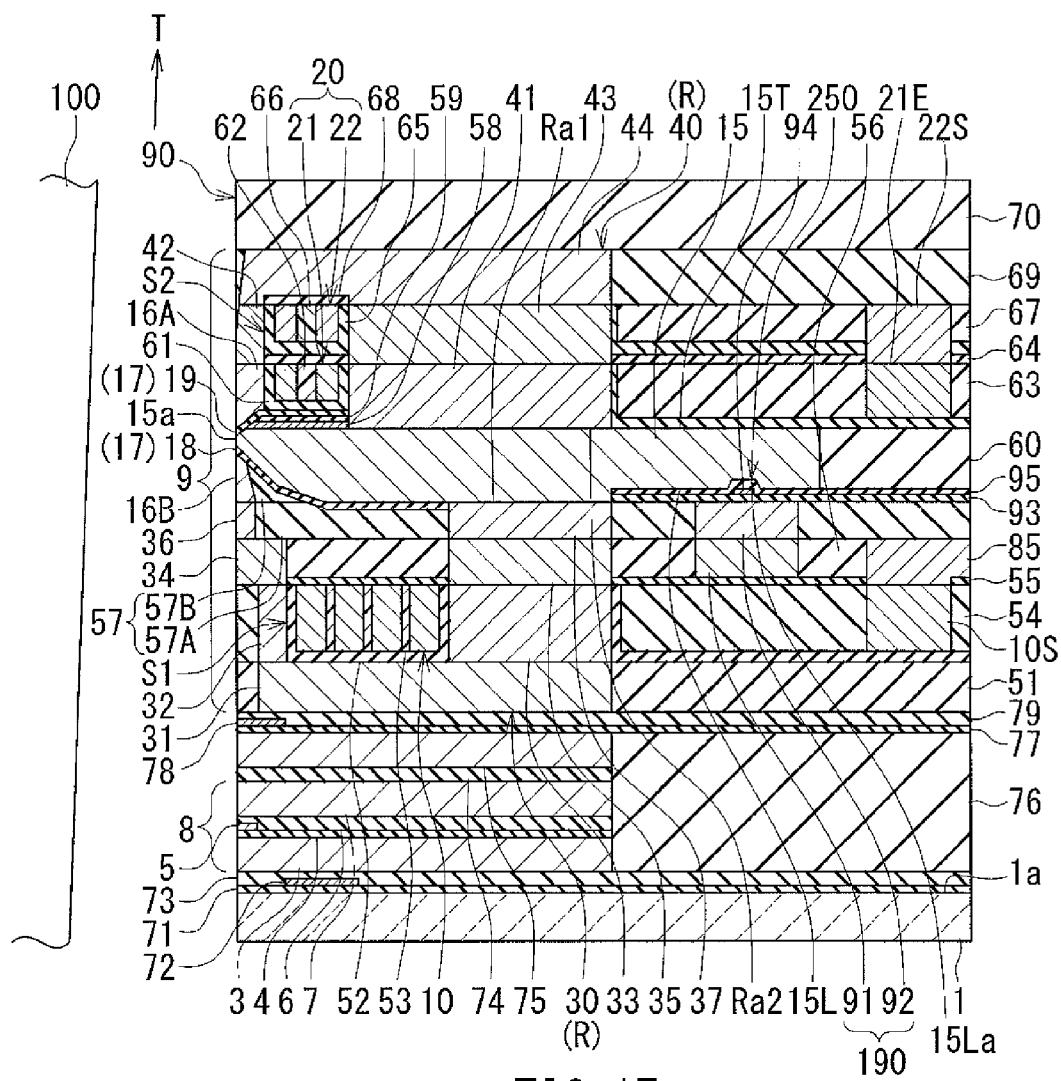
FIG. 17 is a cross-sectional view showing a magnetic head according to a fifth embodiment of the invention.
Figure 18:
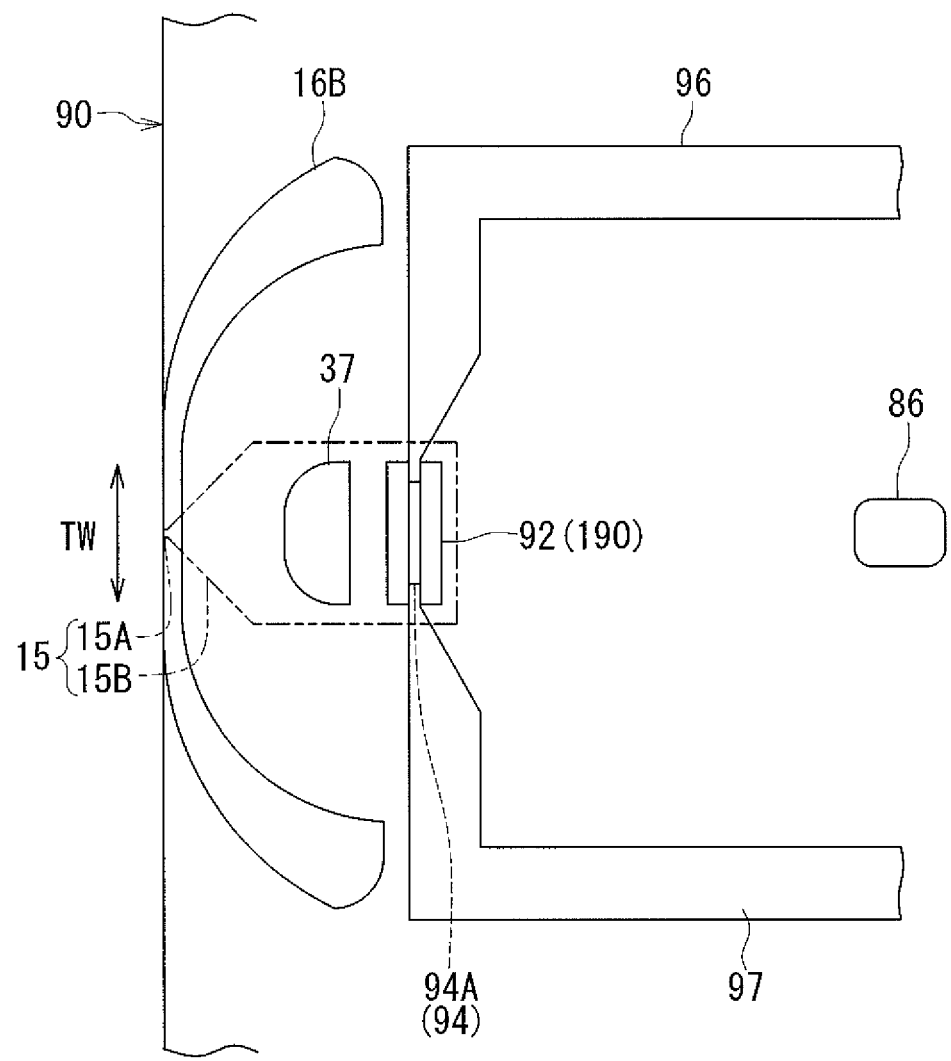
FIG. 18 is a plan view showing the heater of the magnetic head according to the fifth embodiment of the invention.

A magnetic head according to a fifth embodiment of the invention will now be described. First, reference is made to FIG. 17 and FIG. 18 to describe differences of the magnetic head according to the present embodiment from the magnetic head according to the first embodiment. FIG. 17 is a cross-sectional view showing the magnetic head according to the present embodiment. FIG. 18 is a plan view showing the heater of the present embodiment. The insulating layers 81 and 83 are not provided in the present embodiment.

The magnetic head according to the present embodiment includes a heater 94 and a metal portion 190 in place of the heater 82 and the metal portion 84 of the first embodiment. The heater 94 and the metal portion 190 are located on the rear side in the direction T of travel of the recording medium 100 relative to the main pole 15. The heater 94 is located away from the medium facing surface 90 and heats the main pole 15. The metal portion 190 is isolated from the return path section R and disposed such that the heater 94 is interposed between the main pole 15 and the metal portion 190. The metal portion 190 is located farther from the medium facing surface 90 than are the contact surface Ra1 (the top surface of the magnetic layer 37) and the contact surface Ra2 (the bottom surface of the magnetic layer 41) of the return path section R. The main pole 15 and the metal portion 190 define therebetween a receiving space 250 for receiving at least part of the heater 94.

The metal portion 190 includes a first layer 91 and a second layer 92 each formed of a metal material. The first layer 91 is interposed between the magnetic layer 35 and the lead layer 85 and lies on the insulating layer 55. The insulating layer 56 is disposed around the first layer 91. The second layer 92 lies on the first layer 91. The first layer 57A of the nonmagnetic layer 57 is disposed around the second layer 92. The main pole 15 has a recess 15La that opens in the bottom end 15L of the main pole 15. The recess 15La extends in the track width direction TW. Opposite ends of the recess 15La in the track width direction TW are located at the first and second side parts of the main pole 15. The receiving space 250 is a space located between the recess 15La and the top surface of the second layer 92.

At least part of the heater 94 is received in the receiving space 250. The heater 94 includes a line-shaped conductor 94A that generates heat when energized. The line-shaped conductor 94A is located in the receiving space 250. As shown in FIG. 18, the line-shaped conductor 94A extends linearly in the track width direction TW. The magnetic head according to the present embodiment includes a pair of leads 96 and 97 that are connected to opposite ends of the line-shaped conductor 94A. The line-shaped conductor 94A is configured to be energized through the pair of leads 96 and 97 to thereby generate heat. The line-shaped conductor 94A is formed of the same material as the line-shaped conductor 82A of the first embodiment.

The first layer 91 and the second layer 92 may each be formed of the same material as the metal portion 84 of the first embodiment. More specifically, the metal material used to form each of the first layer 91 and the second layer 92 may be a magnetic metal material. Where the metal material used to form the first layer 91 is a magnetic metal material, the magnetic layers 34 and 35 may be formed of the same magnetic metal material as that used for the first layer 91. The magnetic layers 34 and 35 and the first layer 91 are disposed such that an imaginary plane passing through the magnetic layers 34 and 35 and the first layer 91 can lie parallel to the top surface 1a of the substrate 1. Likewise, where the metal material used to form the second layer 92 is a magnetic metal material, the magnetic layers 36 and 37 may be formed of the same magnetic metal material as that used for the second layer 92. The magnetic layers 36 and 37 and the second layer 92 are disposed such that an imaginary plane passing through the magnetic layers 36 and 37 and the second layer 92 can lie parallel to the top surface 1a of the substrate 1.

The magnetic head further includes an insulating layer 93 formed of an insulating material and disposed over the second layer 92 of the metal portion 190 and the first layer 57A of the nonmagnetic layer 57. The insulating layer 93 is formed of alumina, for example. The heater 94 is disposed on the insulating layer 93. The magnetic head further includes an insulating layer 95 formed of an insulating material and covering the insulating layer 93 and the heater 94. In the present embodiment, the second layer 92 of the metal portion 190 is isolated from the main pole 15. The insulating layers 93 and 95 are interposed between the main pole 15 and the second layer 92. The insulating portion of the present embodiment is constituted of a portion of the insulating layer 93 that is located between the line-shaped conductor 94A and the second layer 92 and a portion of the insulating layer 95 that is located between the line-shaped conductor 94A and the main pole 15.

Figure 19:
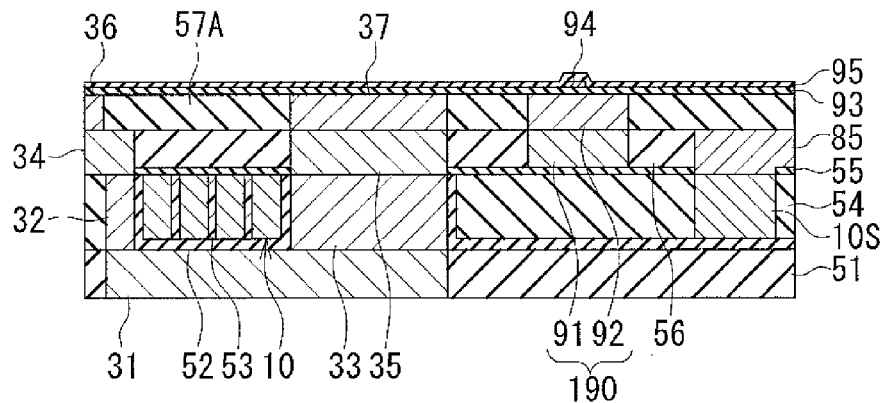
FIG. 19 is a cross-sectional view showing a step of a method of manufacturing the magnetic head according to the fifth embodiment of the invention.
Figure 20:
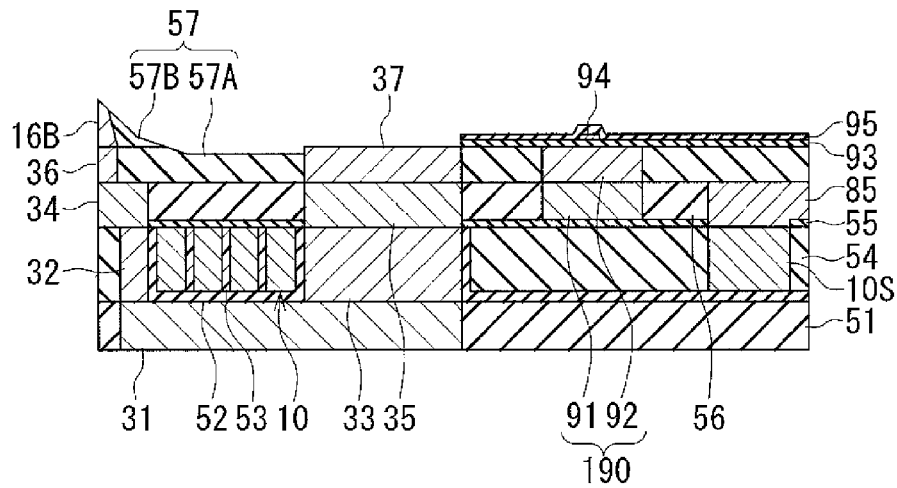
FIG. 20 is a cross-sectional view showing a step that follows the step shown in FIG. 19.
Figure 21:
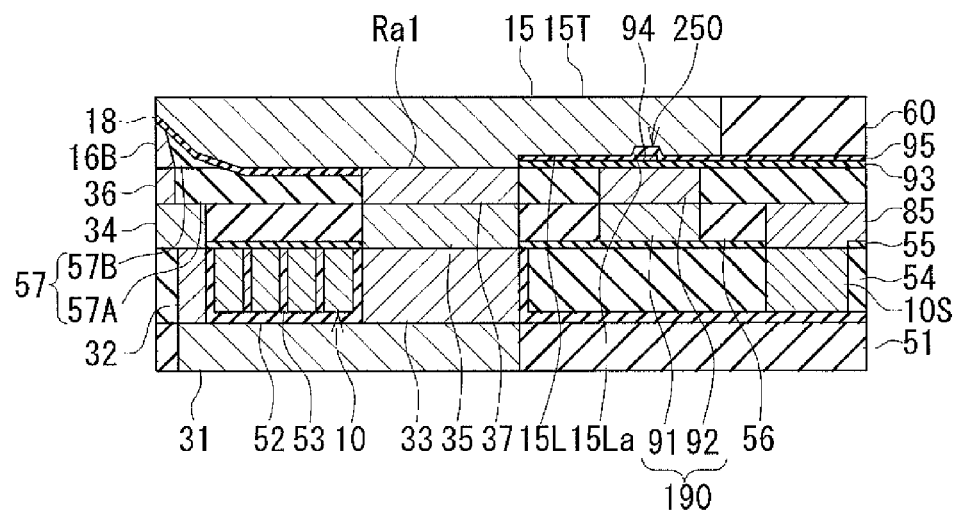
FIG. 21 is a cross-sectional view showing a step that follows the step shown in FIG. 20.

A method of manufacturing the magnetic head according to the present embodiment will now be described with reference to FIG. 19 to FIG. 21. FIG. 19 to FIG. 21 each illustrate a stack of layers formed in the process of manufacturing the magnetic head. Each of FIG. 19 to FIG. 21 shows the main cross section. Portions that are closer to the substrate 1 relative to the magnetic layer 31 and the insulating layer 51 are omitted from FIG. 19 to FIG. 21.

The method of manufacturing the magnetic head according to the present embodiment is the same as the method according to the first embodiment up to the step of etching the insulating layer 55. FIG. 19 shows the next step. In this step, first, the magnetic layer 34 is formed on the magnetic layer 32, the magnetic layer 35 is formed on the magnetic layer 33, and the first layer 91 of the metal portion 190 is formed on the insulating layer 55. At this time, the magnetic layers 34 and 35 and the first layer 91 may be formed of the same magnetic metal material. Further, the lead layer 85 is formed over the coil connection 10S and the insulating layer 55. Next, the insulating layer 56 is formed over the entire top surface of the stack. The insulating layer 56 is then polished by, for example, CMP, until the magnetic layers 34 and 35, the lead layer 85 and the first layer 91 are exposed. Next, the magnetic layer 36 is formed on the magnetic layer 34, the magnetic layer 37 is formed on the magnetic layer 35, and the second layer 92 of the metal portion 190 is formed on the first layer 91. At this time, the magnetic layers 36 and 37 and the second layer 92 may be formed of the same magnetic metal material. Further, the first portion of the connection layer 86 is formed on the lead layer 85.

Next, the first layer 57A of the nonmagnetic layer 57 is formed over the entire top surface of the stack. The first layer 57A is then polished by, for example, CMP, until the magnetic layers 36 and 37, the second layer 92 and the first portion of the connection layer 86 are exposed. Next, the insulating layer 93 is formed over the entire top surface of the stack. The heater 94 and the leads 96 and 97 (see FIG. 18) are then formed on the insulating layer 93. Next, the insulating layer 95 is formed to cover the insulating layer 93, the heater 94 and the leads 96 and 97.

FIG. 20 shows the next step. In this step, first, the insulating layers 93 and 95 are selectively etched by, for example, IBE, so that the top surfaces of the magnetic layers 36 and 37, the top surface of the first portion of the connection layer 86 and a portion of the top surface of the first layer 57A are exposed. Next, the second shield 16B is formed on the magnetic layer 36. A portion of the second shield 16B is then taper-etched by RIE, for example. Next, the second layer 57B of the nonmagnetic layer 57 is formed around the second shield 16B. Respective portions of the second shield 16B, the first layer 57A and the second layer 57B are then taper-etched by IBE, for example.

FIG. 21 shows the next step. In this step, the side shields 16C and 16D, the second gap layer 18, the main pole 15, the second portion of the connection layer 86 and the nonmagnetic layer 60 are formed in the same manner as the first embodiment. The subsequent steps are the same as those in the first embodiment except that the insulating layers 81 and 83, the heater 82 and the leads 87 and 88 are not formed in the present embodiment.

The remainder of configuration, function and effects of the present embodiment are similar to those of the first embodiment. In the present embodiment, the first portion 10 and the first and second layers 21 and 22 of the second portion 20 of the coil may have the respective numbers of turns that are the same as those in the modification example of the first embodiment.

Sixth Embodiment

Figure 22:
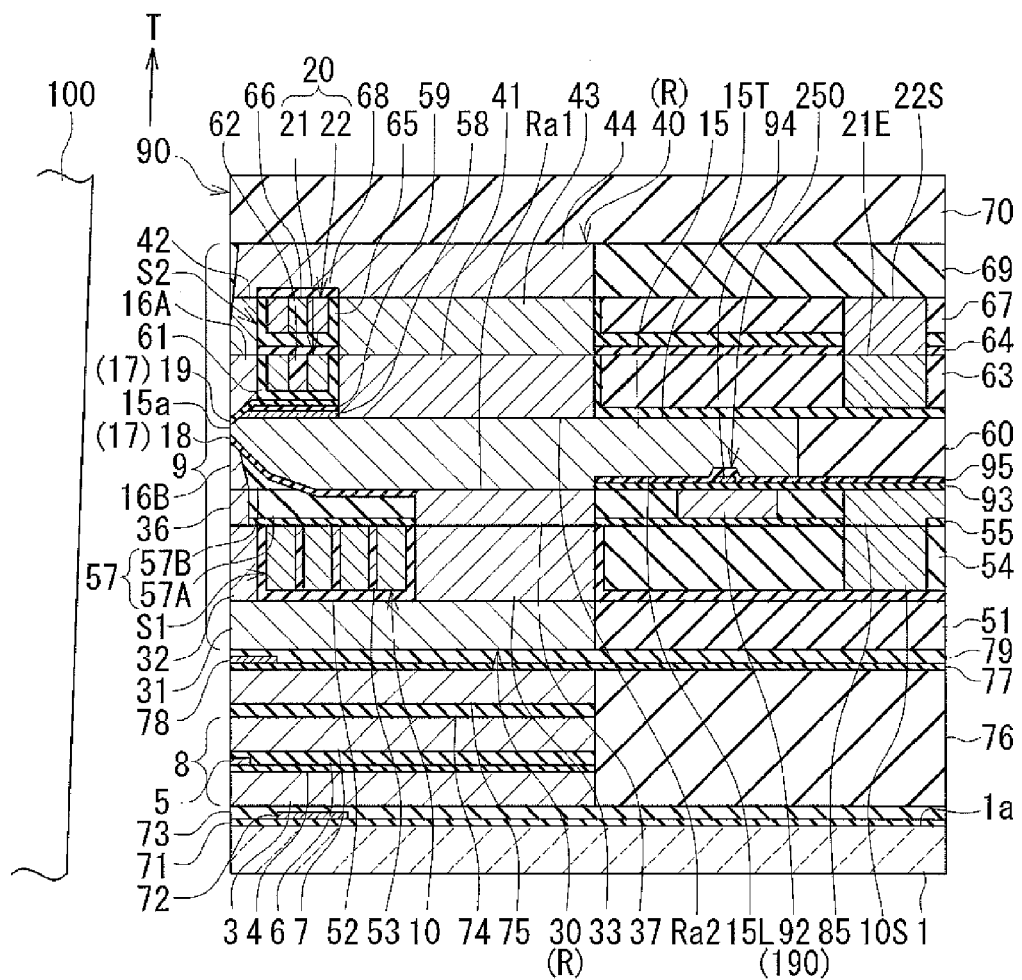
FIG. 22 is a cross-sectional view showing a magnetic head according to a sixth embodiment of the invention.

A magnetic head according to a sixth embodiment of the invention will now be described with reference to FIG. 22. FIG. 22 is a cross-sectional view showing the magnetic head according to the present embodiment. In the magnetic head according to the present embodiment, each of the magnetic layers 31 and 32 has an end face located in the medium facing surface 90. Further, in the present embodiment the magnetic layers 34 and 35, the insulating layer 56 and the first layer 91 of the metal portion 190 are not provided. The magnetic layer 36 is disposed on the magnetic layer 32. The magnetic layer 37 is disposed on the magnetic layer 33. The first layer 57A of the nonmagnetic layer 57 and the second layer 92 of the metal portion 190 are disposed on the insulating layer 55.

The remainder of configuration, function and effects of the present embodiment are similar to those of the fifth embodiment.

Seventh Embodiment

Figure 23:
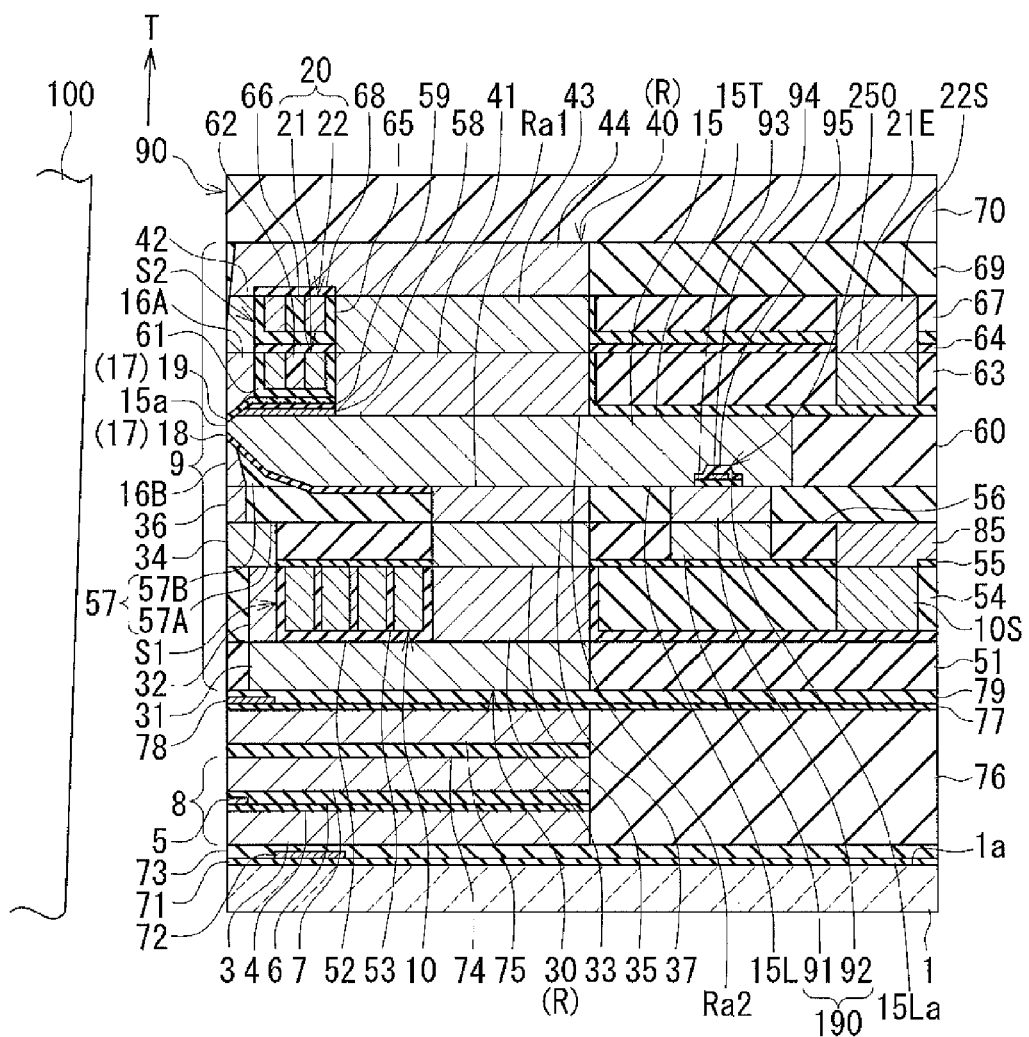
FIG. 23 is a cross-sectional view showing a magnetic head according to a seventh embodiment of the invention.

A magnetic head according to a seventh embodiment of the invention will now be described. First, reference is made to FIG. 23 to describe differences of the magnetic head according to the present embodiment from the magnetic head according to the fifth embodiment. FIG. 23 is a cross-sectional view showing the magnetic head according to the present embodiment. In the present embodiment, the second layer 92 of the metal portion 190 is in contact with the main pole 15. More specifically, portions of the insulating layers 93 and 95 of the fifth embodiment that are located between the main pole 15 and the second layer 92 on the periphery of the heater 94 are eliminated in the present embodiment. The top surface of the second layer 92 on the periphery of the heater 94 is thereby brought into contact with the bottom end 15L of the main pole 15.

The present embodiment allows the main pole 15 to receive most of the heat generated by the heater 94 and transferred to the metal portion 190. The present embodiment thus allows the main pole 15 to be efficiently heated by the heater 94.

Figure 24:
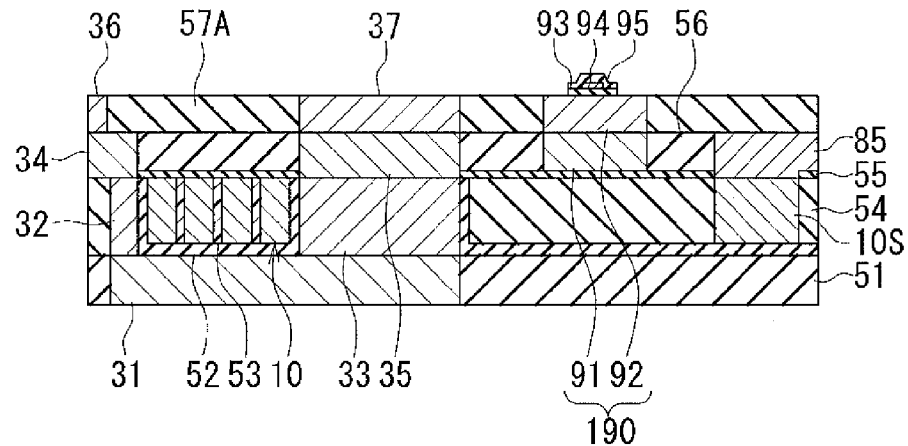
FIG. 24 is a cross-sectional view showing a step of a method of manufacturing the magnetic head according to the seventh embodiment of the invention.
Figure 25:
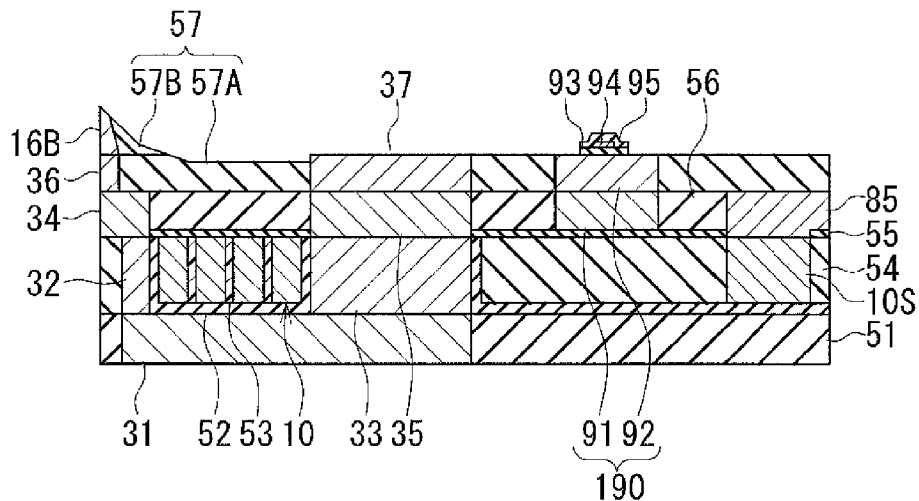
FIG. 25 is a cross-sectional view showing a step that follows the step shown in FIG. 24.
Figure 26:
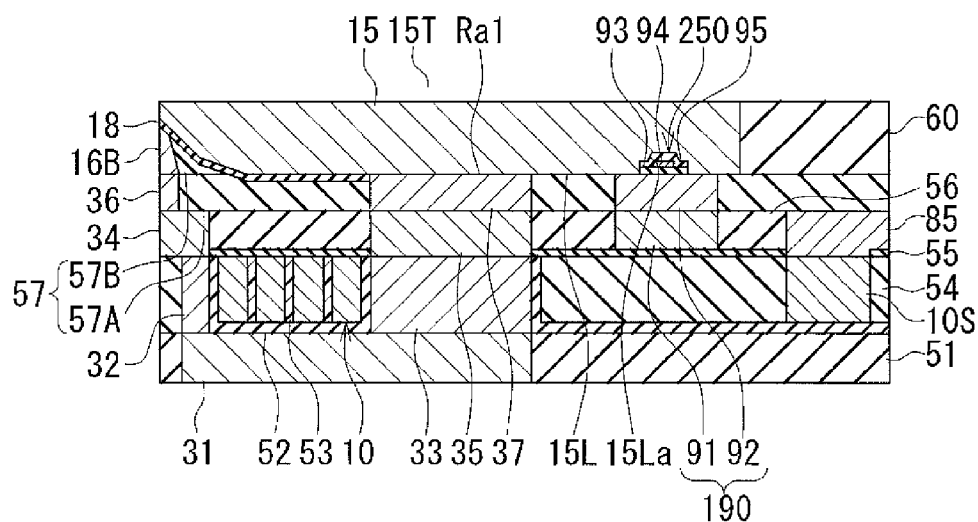
FIG. 26 is a cross-sectional view showing a step that follows the step shown in FIG. 25.

A method of manufacturing the magnetic head according to the present embodiment will now be described with reference to FIG. 24 to FIG. 26. FIG. 24 to FIG. 26 each illustrate a stack of layers formed in the process of manufacturing the magnetic head. Each of FIG. 24 to FIG. 26 shows the main cross section. Portions that are closer to the substrate 1 relative to the magnetic layer 31 and the insulating layer 51 are omitted from FIG. 24 to FIG. 26.

The method of manufacturing the magnetic head according to the present embodiment is the same as the method according to the fifth embodiment up to the step of forming the insulating layer 95. FIG. 24 shows the next step. In this step, the insulating layers 93 and 95 are selectively etched by, for example, IBE, so that the top surfaces of the magnetic layers 36 and 37, the top surface of the first portion of the connection layer 86 and a portion of the top surface of the first layer 57A of the nonmagnetic layer 57 are exposed. In the present embodiment, in particular, respective portions of the insulating layers 93 and 95 that are located in regions in which the second layer 92 and the main pole 15 are in contact with each other are removed. Next, the second shield 16B and the second layer 57B of the nonmagnetic layer 57 are formed in the same manner as the fifth embodiment.

FIG. 26 shows the next step. In this step, the side shields 16C and 16D, the second gap layer 18, the main pole 15, the second portion of the connection layer 86 and the nonmagnetic layer 60 are formed in the same manner as the fifth embodiment. The subsequent steps are the same as those in the fifth embodiment.

The remainder of configuration, function and effects of the present embodiment are similar to those of the fifth embodiment. In the present embodiment, portions of the write head unit 9 from the magnetic layer 31 and the insulating layer 51 to the magnetic layers 36 and 37, the second layer 92 and the first layer 57A of the nonmagnetic layer 57 may be formed in the same configuration as the sixth embodiment.

Eighth Embodiment

Figure 27:
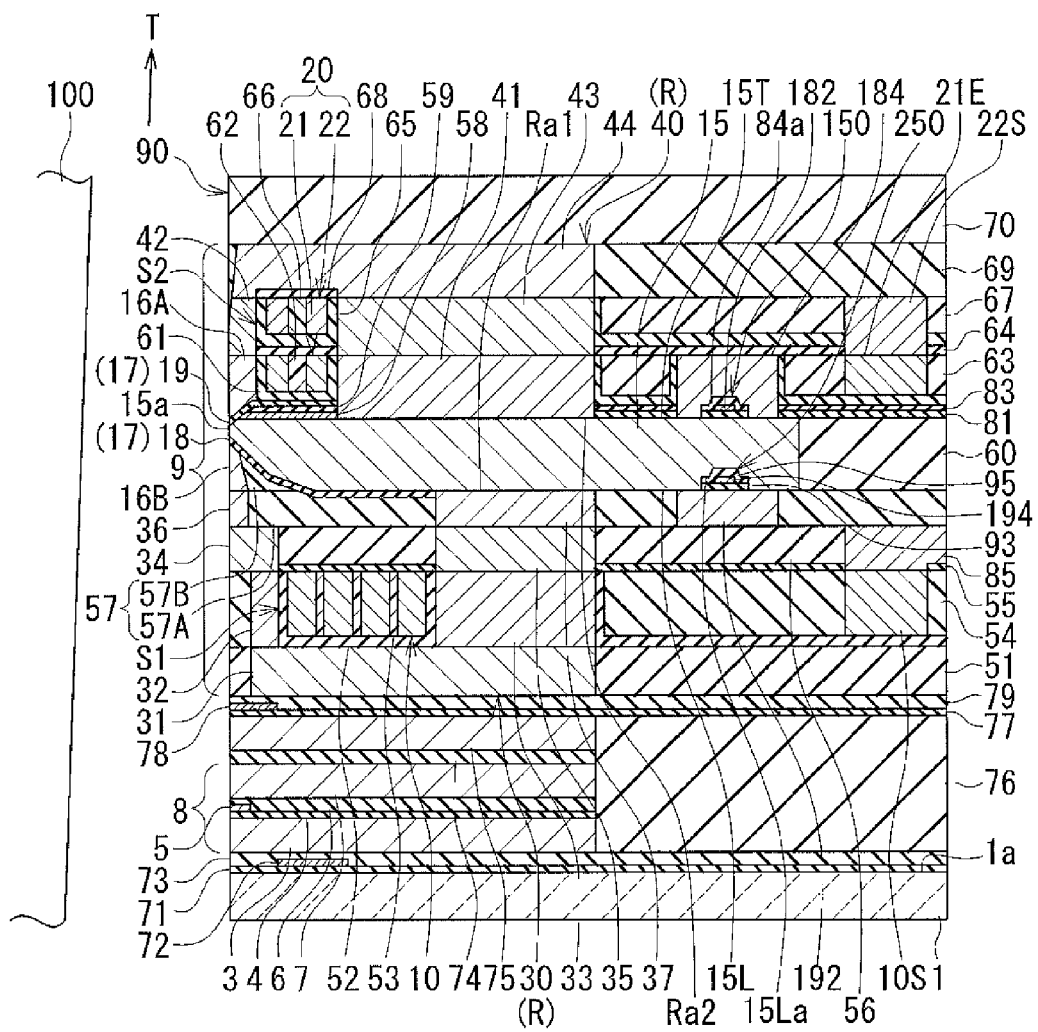
FIG. 27 is a cross-sectional view showing a magnetic head according to an eighth embodiment of the invention.

A magnetic head according to an eighth embodiment of the invention will now be described with reference to FIG. 27. FIG. 27 is a cross-sectional view showing the magnetic head according to the present embodiment. The magnetic head according to the present embodiment is provided with a heater including a first heater portion 182 located on the front side in the direction T of travel of the recording medium 100 relative to the main pole 15 and a second heater portion 194 located on the rear side in the direction T of travel of the recording medium 100 relative to the main pole 15. The magnetic head is further provided with a metal portion including a first portion 184 disposed such that the first heater portion 182 is interposed between the main pole 15 and the first portion 184, and a second portion 192 disposed such that the second heater portion 194 is interposed between the main pole 15 and the second portion 192.

The shapes and locations of the first heater portion 182 and the first portion 184 are the same as those of the heater 82 and the metal portion 84 of the first embodiment. As in the fourth (first) embodiment, the main pole 15 and the first portion 184 define therebetween a receiving space 150 for receiving at least part of the first heater portion 182. The at least part of the first heater portion 182 is received in the receiving space 150. The first heater portion 182 includes the line-shaped conductor 82A described in the first embodiment section. The line-shaped conductor 82A is located in the receiving space 150. Further, the magnetic head includes a pair of leads 87 and 88 (see FIG. 4) that are connected to opposite ends of the line-shaped conductor 82A, and the insulating layers 81 and 83 described in the fourth embodiment section.

The shapes and locations of the second heater portion 194 and the second portion 192 are the same as those of the heater 94 and the second layer 92 of the metal portion 190 of the seventh embodiment. As in the seventh (fifth) embodiment, the main pole 15 and the second portion 192 define therebetween a receiving space 250 for receiving at least part of the second heater portion 194. The at least part of the second heater portion 194 is received in the receiving space 250. The second heater portion 194 includes the line-shaped conductor 94A described in the fifth embodiment section. The line-shaped conductor 94A is located in the receiving space 250. Further, the magnetic head includes a pair of leads 96 and 97 (see FIG. 18) that are connected to opposite ends of the line-shaped conductor 94A, and the insulating layers 93 and 95 described in the seventh embodiment section.

The present embodiment allows the main pole 15 to be efficiently heated by the first and second heater portions 182 and 194 of the heater which are located on the front side and the rear side, respectively, in the direction T of travel of the recording medium 100 relative to the main pole 15. Further, in the present embodiment, the first and second portions 184 and 192 of the metal portion are each in contact with the main pole 15. The present embodiment allows the main pole 15 to receive most of the heat generated by the first and second heater portions 182 and 194 and transferred to the first and second portions 184 and 192. In the present embodiment, this feature also serves to allow the main pole 15 to be efficiently heated by the first and second heater portions 182 and 194.

The remainder of configuration, function and effects of the present embodiment are similar to those of the fourth or seventh embodiment.

The present invention is not limited to the foregoing embodiments, and various modifications may be made thereto. For example, the heater of the present invention is not limited to the one described in each of the foregoing embodiments, and may be any other heater capable of generating heat.

Further, in the present invention, the heater 72 and the contact sensor 78 are not essential components, and can be dispensed with.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
    a medium facing surface facing a recording medium;
    a coil producing a magnetic field that corresponds to data to be written on the recording medium,
    a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
    a return path section formed of a magnetic material, the return path section allowing a portion of a magnetic flux that has been produced from the end face of the main pole and has magnetized a portion of the recording medium to flow back to the main pole,
    a heater located away from the medium facing surface and heating the main pole, and
    a metal portion formed of a metal material, the metal portion being isolated from the return path section and disposed such that the heater is interposed between the main pole and the metal portion, wherein
    the return path section has one or more contact surfaces in contact with the main pole,
    the one or more contact surfaces are located away from the medium facing surface,
    the metal portion is located farther from the medium facing surface than are the one or more contact surfaces,
    the main pole and the metal portion define therebetween a receiving space for receiving at least part of the heater, and
    the at least part of the heater is received in the receiving space.

2. The magnetic head for perpendicular magnetic recording according to claim 1, wherein the metal portion is in contact with the main pole.

3. The magnetic head for perpendicular magnetic recording according to claim 1, wherein the metal portion is isolated from the main pole.

4. The magnetic head for perpendicular magnetic recording according to claim 1, further comprising:
    a write shield formed of a magnetic material and having an end face located in the medium facing surface; and
    a gap part formed of a nonmagnetic material and provided between the main pole and the write shield,
    wherein the write shield is magnetically connected to the return path section.

5. The magnetic head for perpendicular magnetic recording according to claim 1, wherein the heater and the metal portion are located on a front side in a direction of travel of the recording medium relative to the main pole.

6. The magnetic head for perpendicular magnetic recording according to claim 1, wherein the heater and the metal portion are located on a rear side in a direction of travel of the recording medium relative to the main pole.

7. The magnetic head for perpendicular magnetic recording according to claim 1, wherein
    the heater includes a first heater portion located on a front side in a direction of travel of the recording medium relative to the main pole, and a second heater portion located on a rear side in the direction of travel of the recording medium relative to the main pole, and
    the metal portion includes a first portion disposed such that the first heater portion is interposed between the main pole and the first portion, and a second portion disposed such that the second heater portion is interposed between the main pole and the second portion.

8. The magnetic head for perpendicular magnetic recording according to claim 1, wherein
    the metal material used to form the metal portion is a magnetic metal material, and
    the return path section includes a magnetic layer formed of the same magnetic metal material as that used for the metal portion.

* * * * *